Nov. 24, 1925.

O. L. KLEBER

PRINTING TELEGRAPH MACHINE

Filed Feb. 15, 1921  26 Sheets-Sheet 3

INVENTOR.
OSCAR L. KLEBER
by
Ralph Donath
his ATTORNEY

Nov. 24, 1925.

O. L. KLEBER 1,562,457

PRINTING TELEGRAPH MACHINE

Filed Feb. 15, 1921 26 Sheets-Sheet 4

INVENTOR.
OSCAR L. KLEBER
BY Ralph Donath
HIS ATTORNEY.

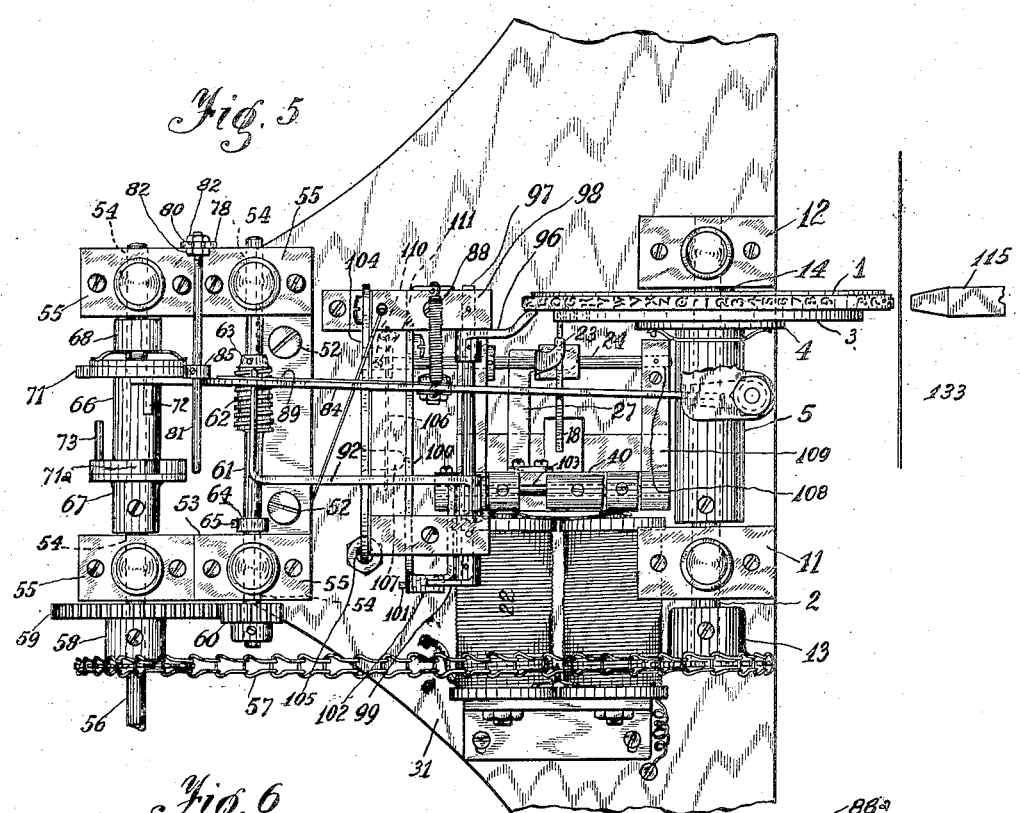

Nov. 24, 1925.
O. L. KLEBER
PRINTING TELEGRAPH MACHINE
Filed Feb. 15, 1921 26 Sheets-Sheet 6
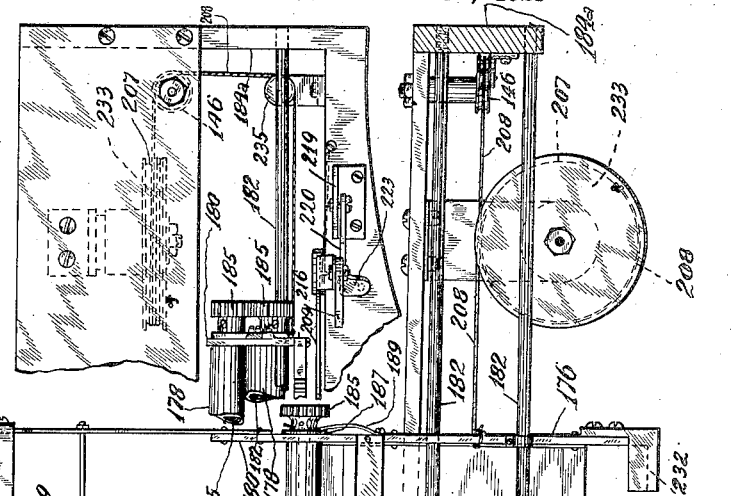
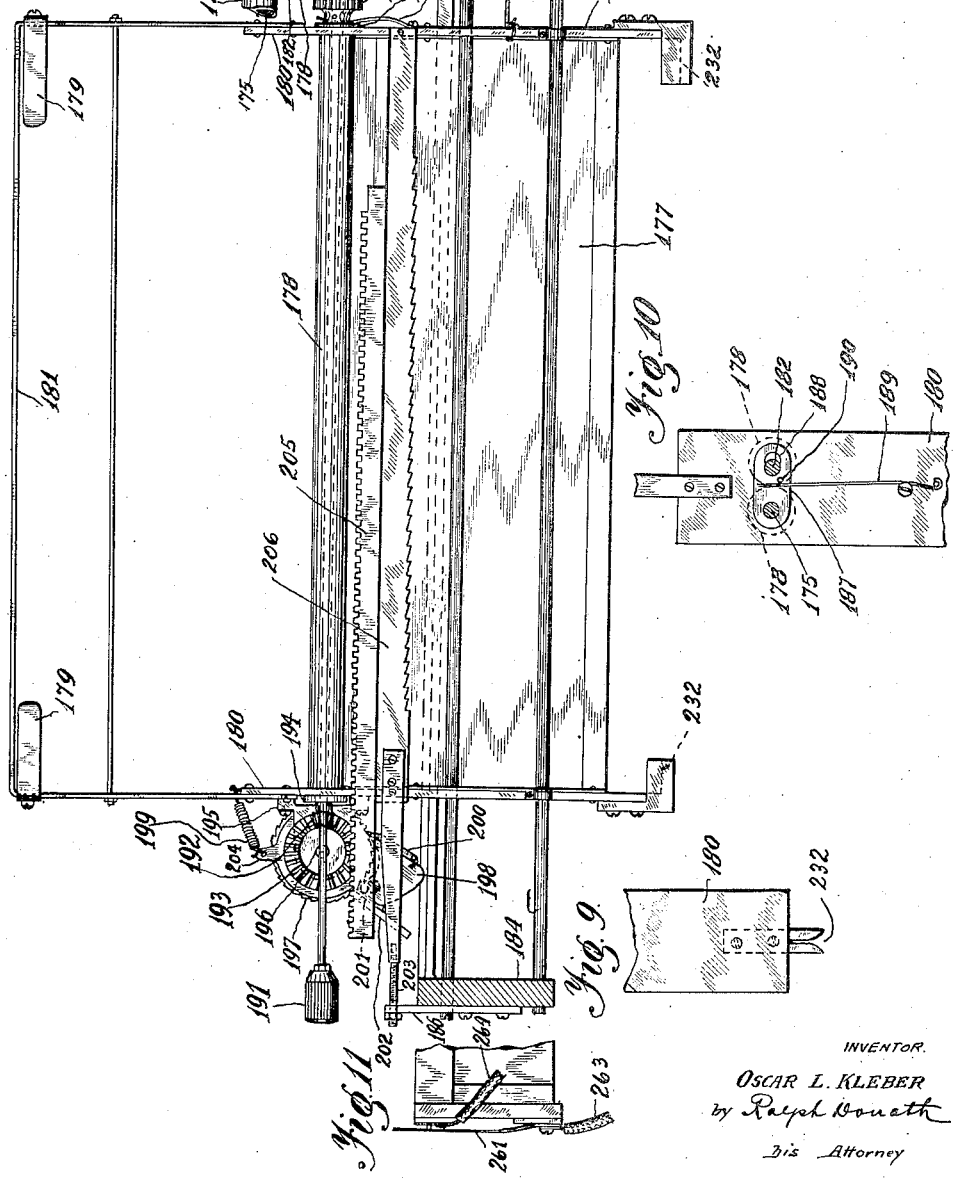
INVENTOR.
OSCAR L. KLEBER
by Ralph Doneth
his Attorney

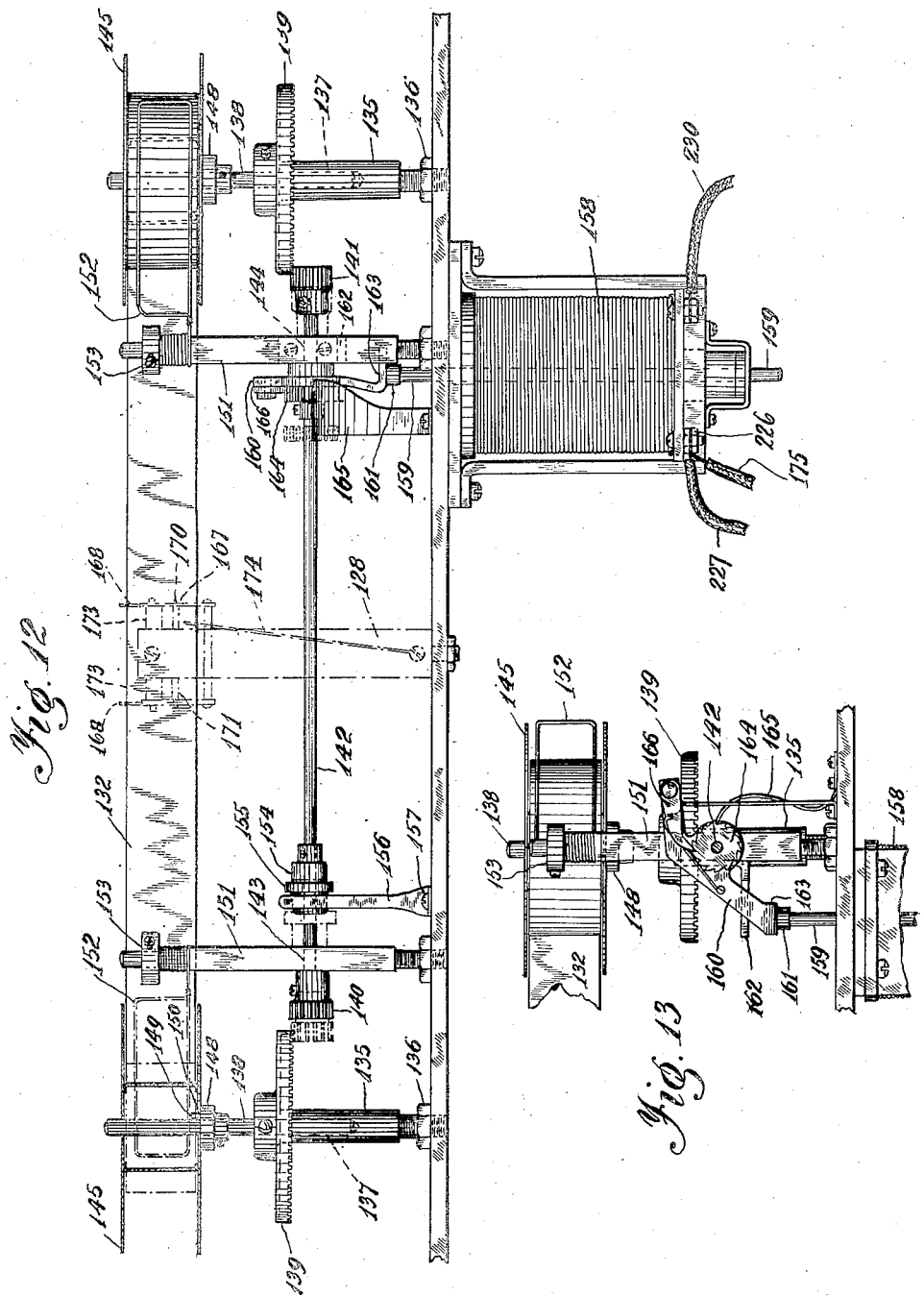

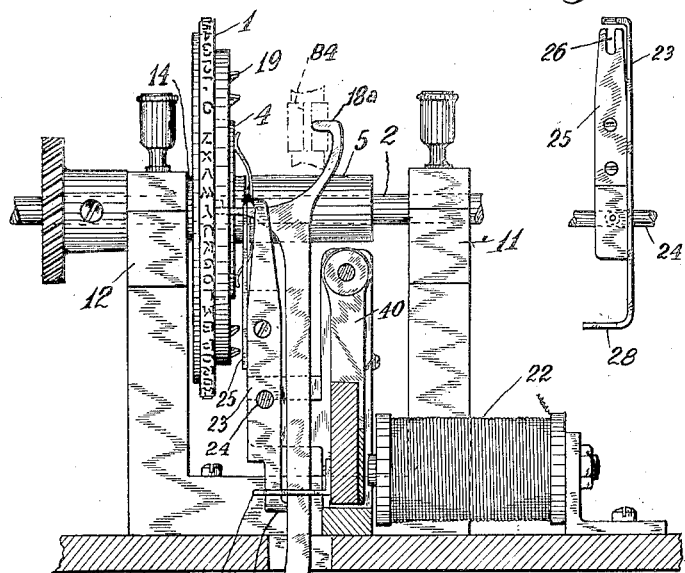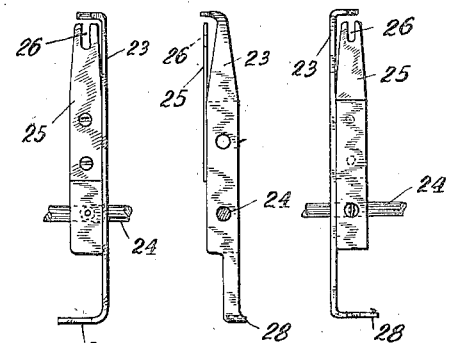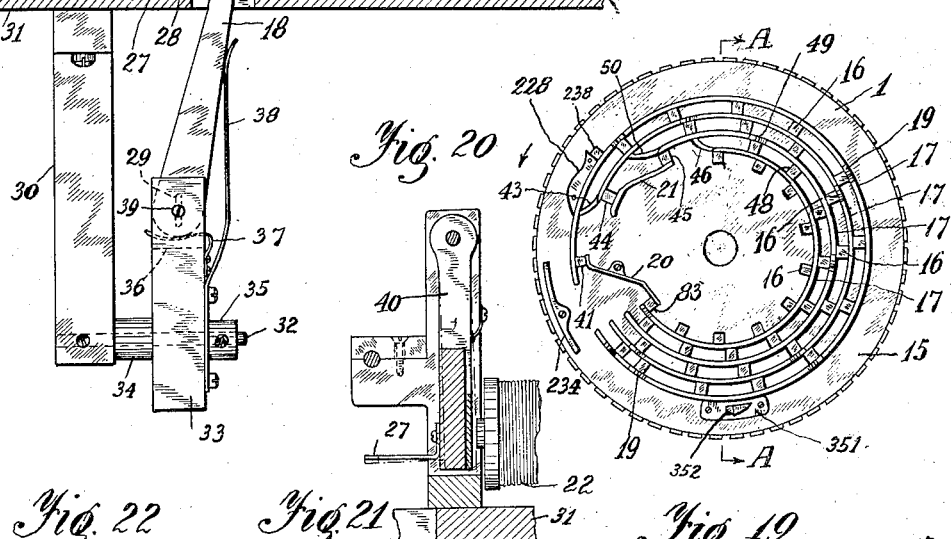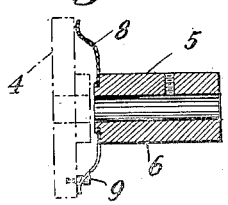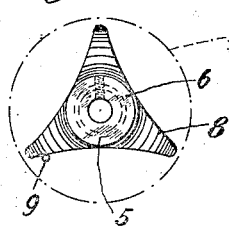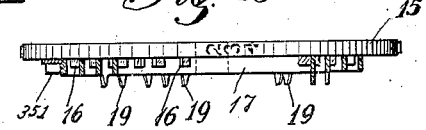

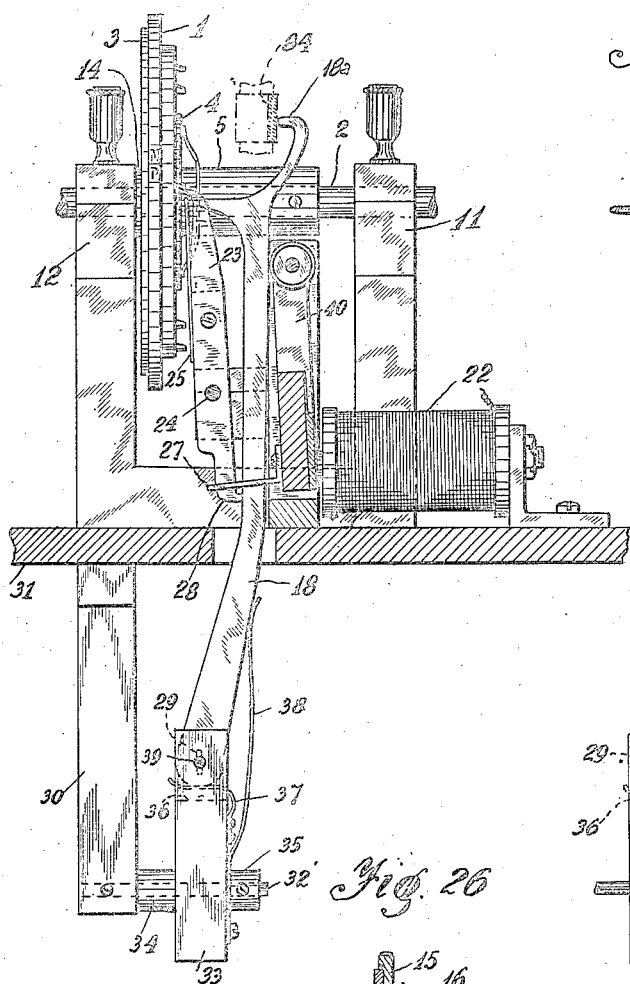

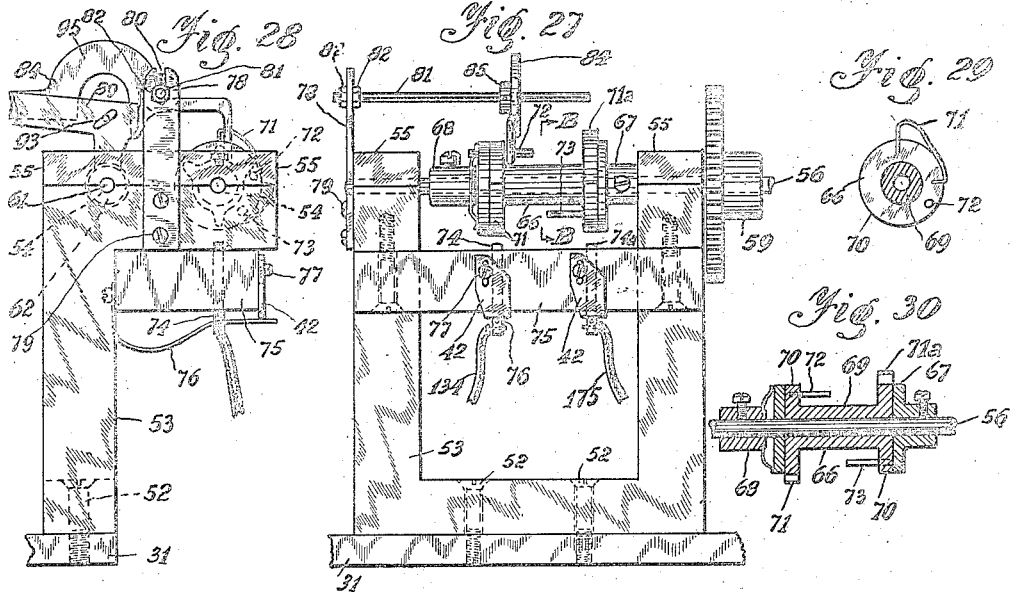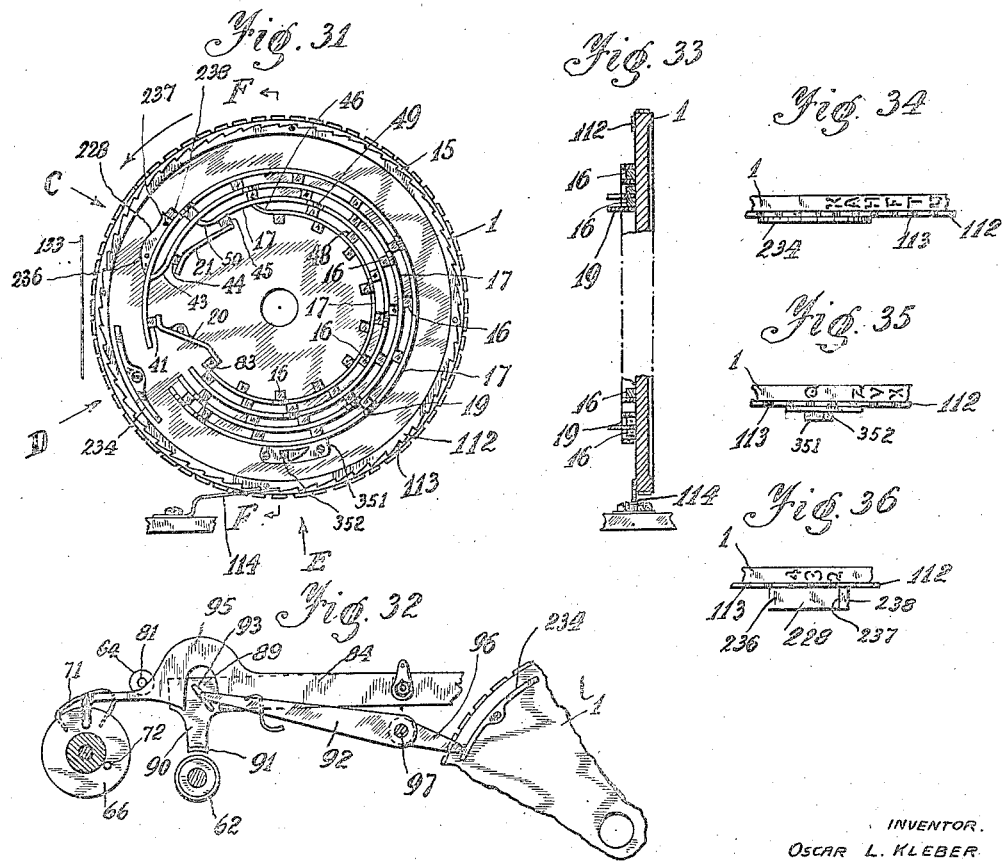

Nov. 24, 1925.  
O. L. KLEBER  
PRINTING TELEGRAPH MACHINE  
Filed Feb. 15, 1921 26 Sheets-Sheet 11
1,562,457
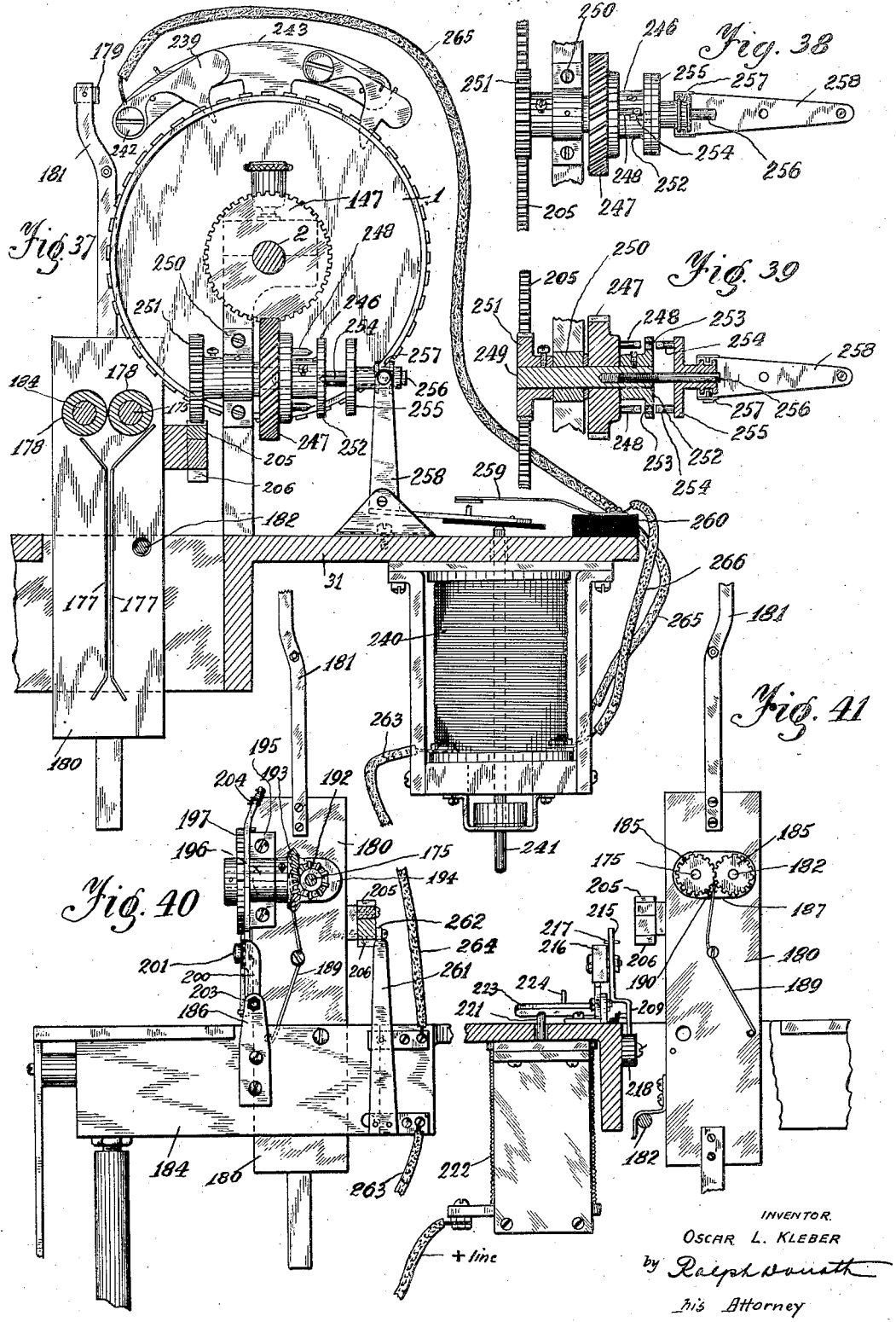
INVENTOR.  
OSCAR L. KLEBER  
by Ralph Donath  
his Attorney

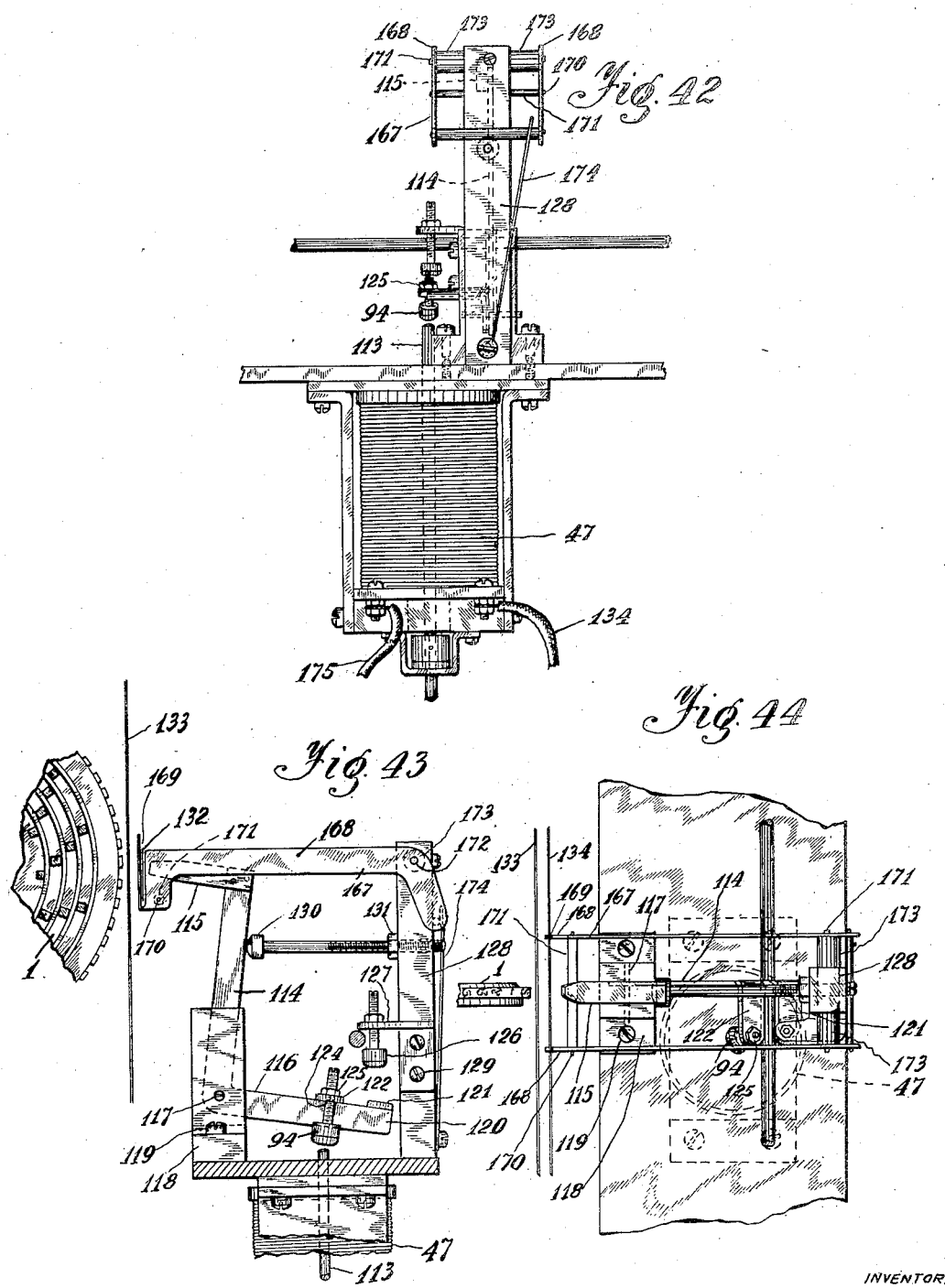

Nov. 24, 1925.
O. L. KLEBER
PRINTING TELEGRAPH MACHINE
Filed Feb. 15, 1921    26 Sheets-Sheet 13
1,562,457
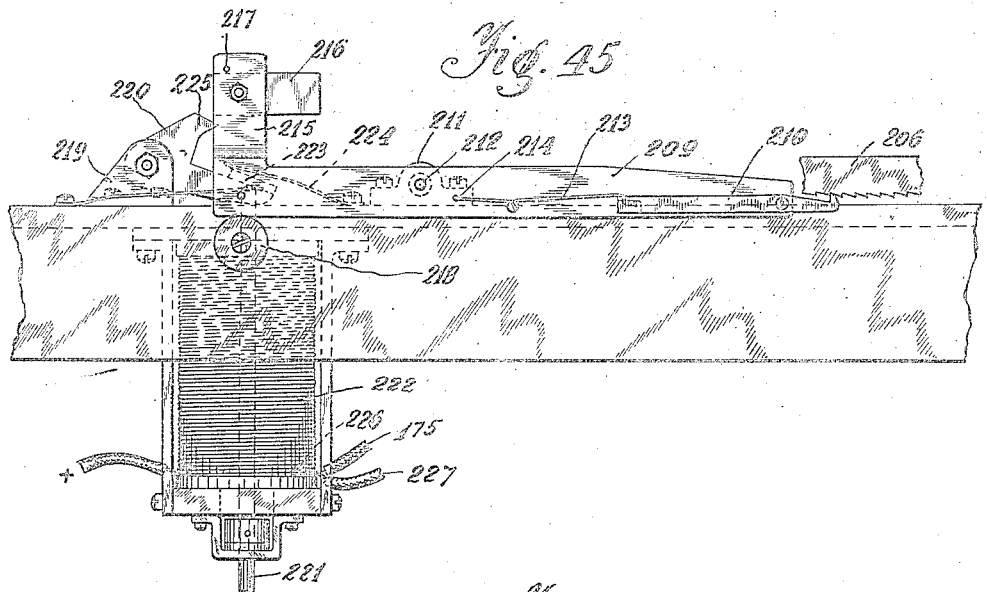
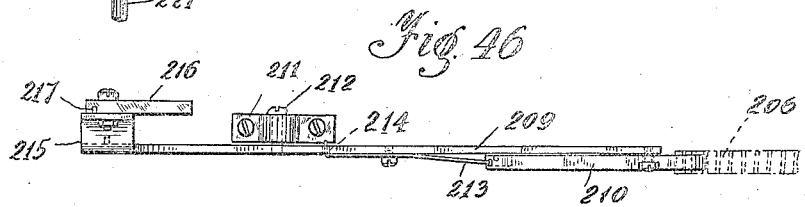
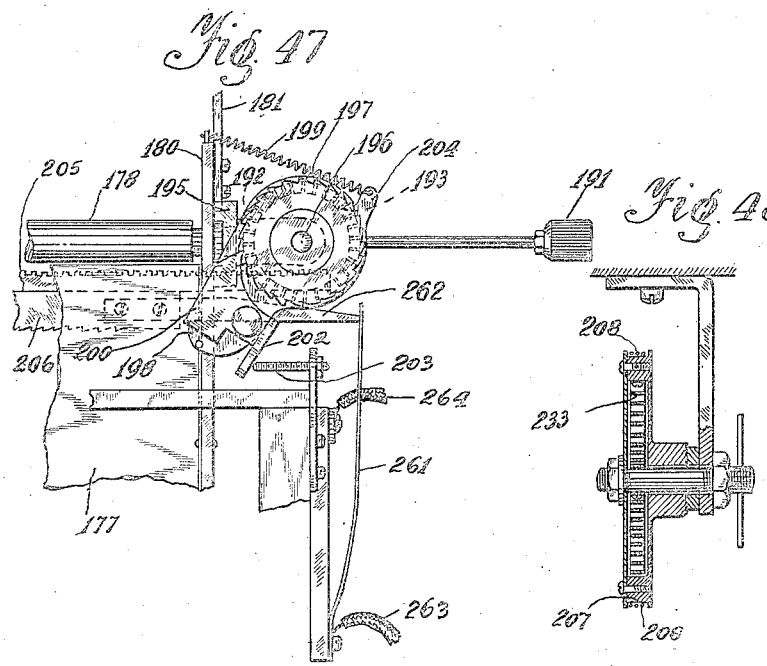
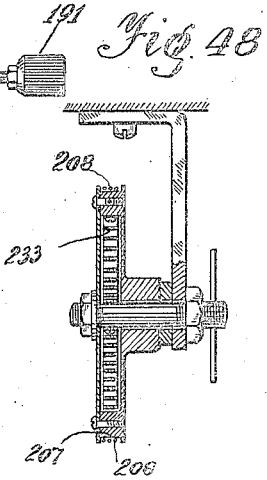
INVENTOR.
OSCAR L. KLEBER
by Ralph Vanath
his Attorney Nov. 24, 1925.
O. L. KLEBER
1,562,457
PRINTING TELEGRAPH MACHINE
Filed Feb. 15, 1921    26 Sheets-Sheet 14
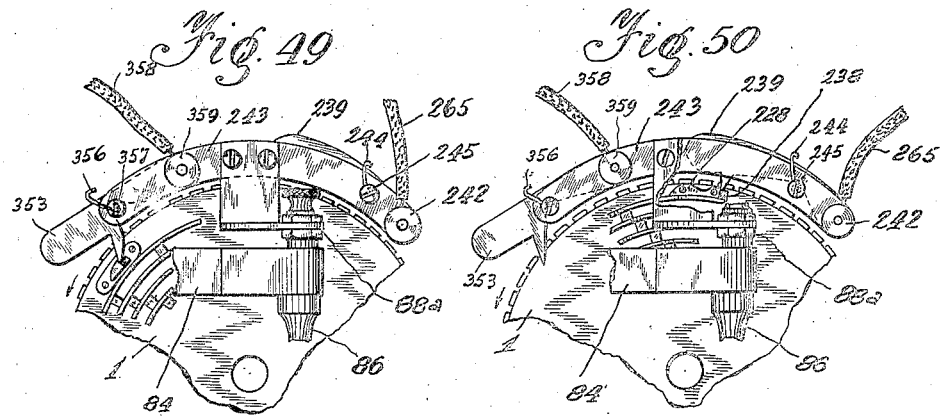
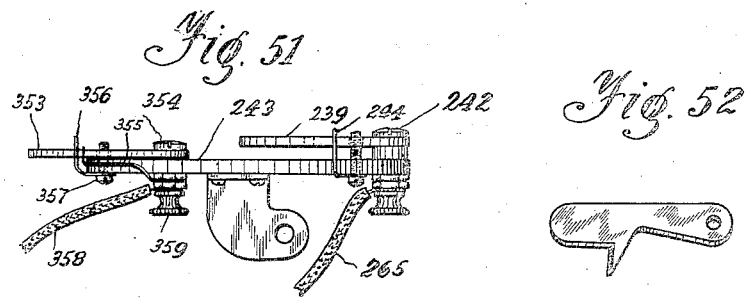
INVENTOR.
Oscar L. Kleber
By Ralph Donath
his Attorney Nov. 24, 1925.     1,562,457
O. L. KLEBER
PRINTING TELEGRAPH MACHINE
Filed Feb. 15, 1921    26 Sheets-Sheet 15
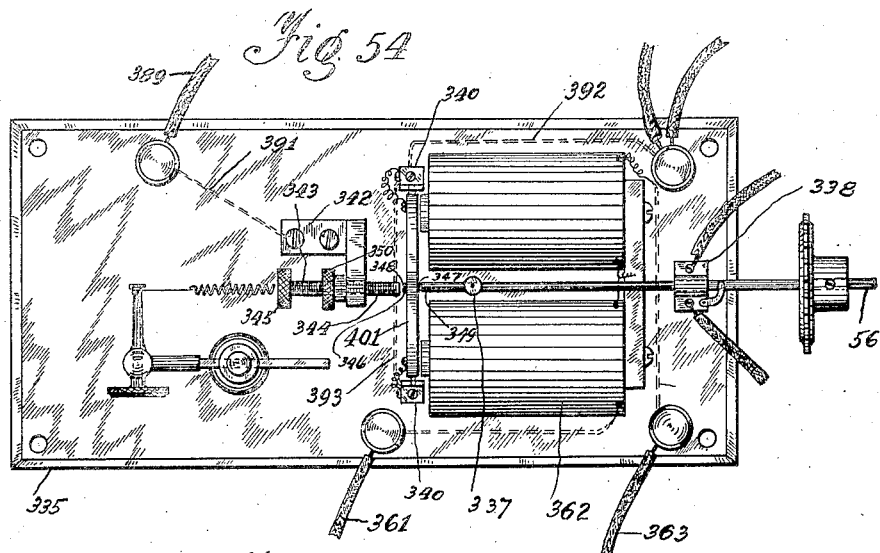
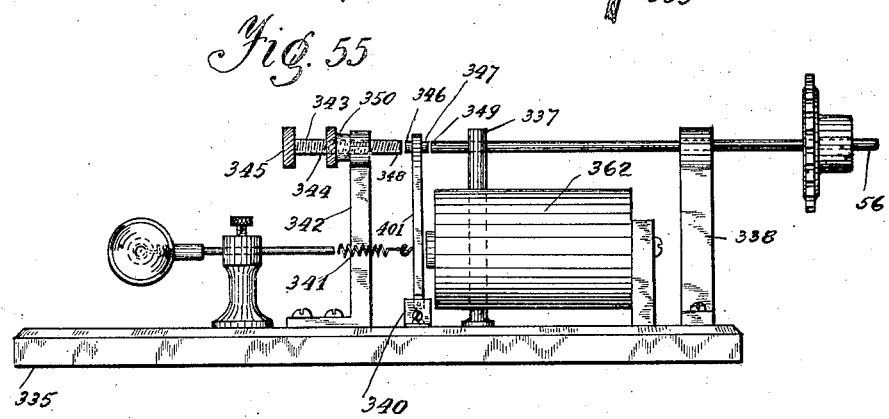
INVENTOR.
OSCAR L. KLEBER
by Ralph Womrath
His Attorney Nov. 24, 1925.

O. L. KLEBER 1,562,457

PRINTING TELEGRAPH MACHINE

Filed Feb. 15, 1921   26 Sheets-Sheet 16

INVENTOR.
Oscar L. Kleber
by Ralph Nonath
His Attorney

Nov. 24, 1925.                                               1,562,457
O. L. KLEBER
PRINTING TELEGRAPH MACHINE
Filed Feb. 15, 1921          26 Sheets-Sheet 17
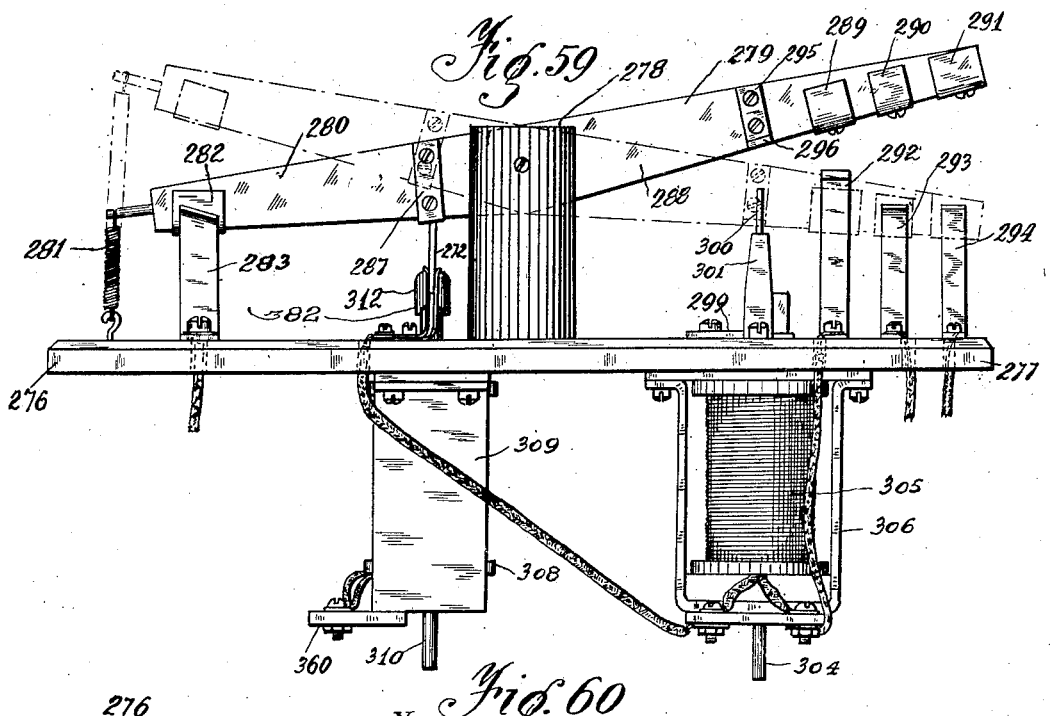
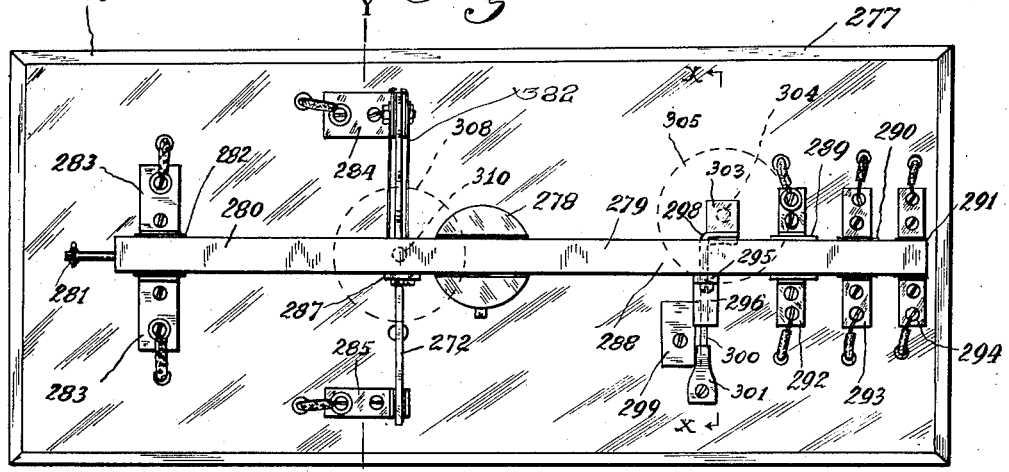
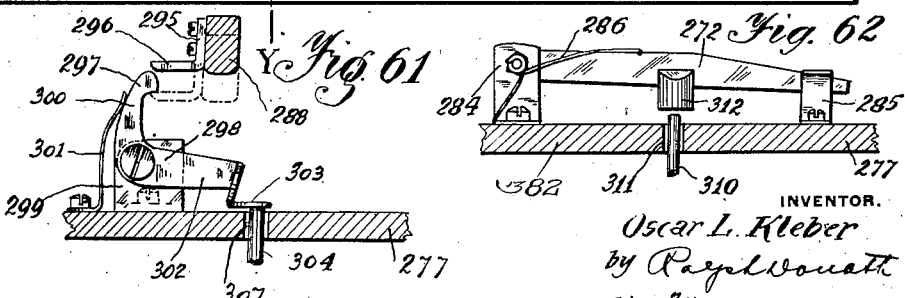
INVENTOR.
Oscar L. Kleber
by his Attorney.

Nov. 24, 1925.

O. L. KLEBER 1,562,457

PRINTING TELEGRAPH MACHINE

Filed Feb. 15, 1921    26 Sheets-Sheet 18

INVENTOR.
OSCAR L. KLEBER
by Ralph Nouath
his Attorney

Nov. 24, 1925.                                                    1,562,457
O. L. KLEBER
PRINTING TELEGRAPH MACHINE
Filed Feb. 15, 1921      26 Sheets-Sheet 19

INVENTOR.
OSCAR L. KLEBER
his Attorney

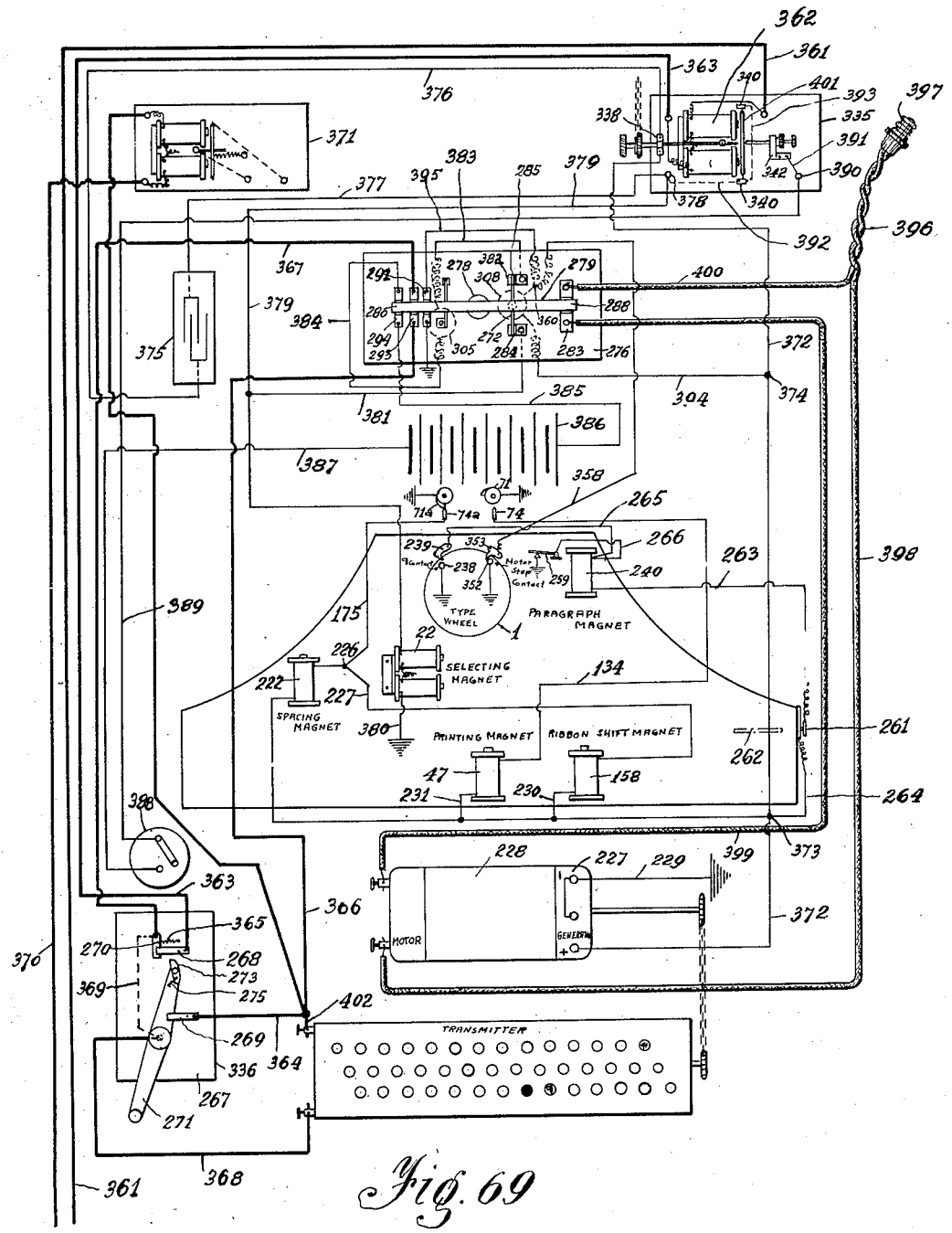

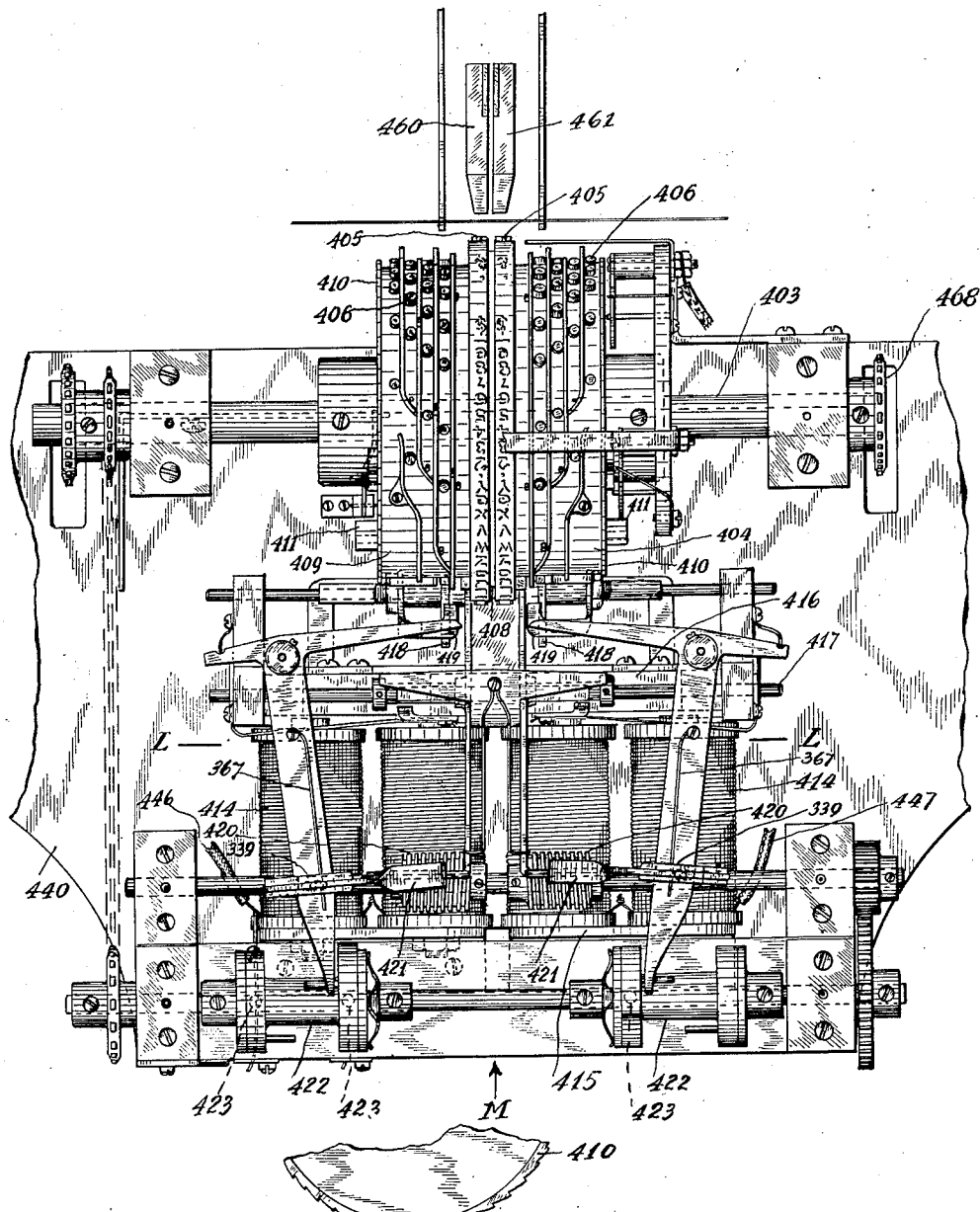

Nov. 24, 1925.
O. L. KLEBER
PRINTING TELEGRAPH MACHINE
Filed Feb. 15, 1921   26 Sheets-Sheet 22
1,562,457
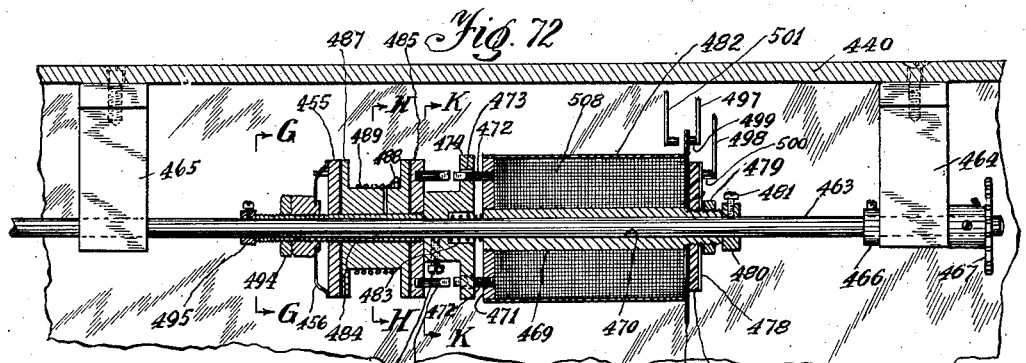
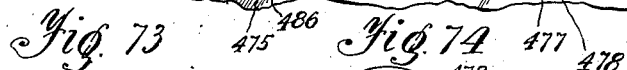
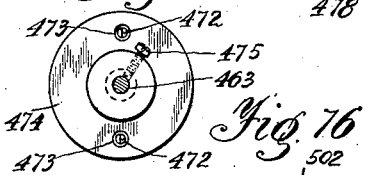
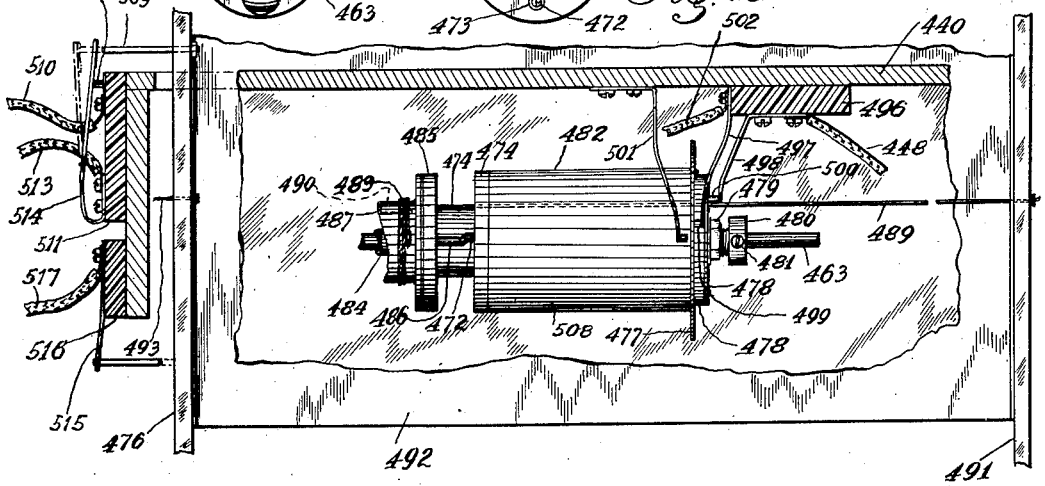
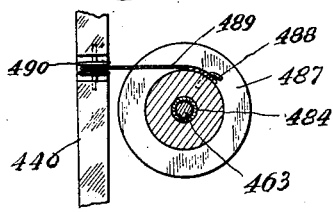
INVENTOR.
OSCAR L. KLEBER
by Ralph Donath
Attorney Nov. 24 1925.

O. L. KLEBER 1,562,457

PRINTING TELEGRAPH MACHINE

Filed Feb. 15, 1921     26 Sheets-Sheet 23

INVENTOR.
OSCAR L. KLEBER
by Ralph Vonath
his Attorney

Nov. 24, 1925.  
O. L. KLEBER  
PRINTING TELEGRAPH MACHINE  
Filed Feb. 15, 1921    26 Sheets-Sheet 24

1,562,457

INVENTOR.  
OSCAR L. KLEBER  
by Ralph Neonath  
his ATTORNEY

Nov. 24, 1925.

O. L. KLEBER

PRINTING TELEGRAPH MACHINE

Filed Feb. 15, 1921    26 Sheets-Sheet 25

INVENTOR
OSCAR L. KLEBER
by Ralph Donath
his Attorney

Nov. 24, 1925.    1,562,457
O. L. KLEBER
PRINTING TELEGRAPH MACHINE
Filed Feb. 15, 1921    26 Sheets-Sheet 26

INVENTOR
Oscar L. Kleber
by Ralph Donath
his Attorney

Patented Nov. 24, 1925.

1,562,457

UNITED STATES PATENT OFFICE.

OSCAR L. KLEBER, OF PITTSBURGH, PENNSYLVANIA, ASSIGNOR TO TELEGRAPH TYPEWRITER CO., INC., OF NEW YORK, N. Y.

PRINTING-TELEGRAPH MACHINE.

Application filed February 15, 1921. Serial No. 445,180.

*To all whom it may concern:*

Be it known that I, OSCAR L. KLEBER, a citizen of the United States, residing at Pittsburgh, in the county of Allegheny and State of Pennsylvania, have invented certain new and useful Improvements in Printing-Telegraph Machines, of which the following is a specification.

In my prior Patents Nos. 537,464, 575,830, 712,939 and 1,138,958, I have shown a type of printing telegraph machine which is adapted to use the conventional signals of a Morse code to control selecting mechanism, to translate the Morse impulses into printed letters or figures, and which comprises other mechanism adapted to perform some of the auxiliary functions of the machine such as spacing, advancing the ribbon from which an impression is made, etc.

My present invention aims to provide a machine which is adapted to operate upon the conventional Morse telegraphic circuit and contains improved means for performing the several functions of the machine of my said prior patents and other useful functions of the machine in addition thereto and will operate with the maximum of speed and reliability.

The machine of the present application is of such a character that it may be used under substantially all circumstances in which an ordinary Morse sounder can be used and its use does not require the substantial modification of a telephone or telegraph line to which the conventional Morse system would be applicable, and departs widely from the machine of my said prior patents in many other particulars, especially in respect of simplicity and certainty of operation, and these departures will be more particularly referred to in the following specification.

I have chosen to describe herein more particularly a machine of the double typewheel type, that being the most highly developed form of my invention, but the description will be understood to apply to the simpler types of my machine, such as the single typewheel page-writer, the single typewheel tape-writer (or ticker) and to both disc and drum, and I do not intend to limit the scope of my claims to any particular type of machine. It will also be obvious to those skilled in the art that many of the mechanisms or groups of mechanisms hereinafter described may be bodily applied without substantial alteration to other machines adapted to perform some or all of the functions of the machine of my invention, and I intend to cover in my claims said mechanisms or groups of mechanisms wherever used, whether in connection with a machine of the type of that of my invention or not.

Fig. 5 is a fragmentary plan view of the receiving apparatus constructed in accordance with this invention.

Fig. 6 is a side elevation of the above with bearings, gears and chain removed.

Fig. 7 is a front elevation of the paper carriage and its associated parts.

Fig. 8 is a fragmentary top elevation of the paper carriage showing means for returning to normal position.

Fig. 9 is a fragmentary side elevation of the lower part of the paper carriage showing the slot for receiving the paper.

Fig. 10 is a side elevation of one end of the paper rollers and the method of holding the same together, with the knobs removed.

Fig. 11 is an end elevation of the contact breaking device operated by the paper carriage, partially broken away.

Fig. 12 is a front elevation of the ribbon shifting device.

Fig. 13 is a side elevation of the same with parts of the solenoid and frame broken away.

Fig. 14 is a general view of the selecting magnets and selecting mechanism, the "dot" finger being shown in operative position.

Fig. 15 is a front detail view of the "dash" finger.

Figs. 16 and 17 are side and rear elevations of the same.

Fig. 18 is a plan view of the typewheel.

Fig. 19 is a cross-section thereof on line A—A, the type band shown in outline.

Fig. 20 is a fragmentary side elevation of the selecting magnet and armature, indicating in dotted lines the armature against the core of the magnet.

Fig. 21 is a plan view of the typewheel friction adjusting device.

Fig. 22 is a cross-section thereof.

Fig. 23 is a similar view as Fig. 14, excepting the "dash" finger is in operative position.

Fig. 24 is a plan view of the "dot" finger and associated parts.

Fig. 25 is a side elevation of the same.

Fig. 26 is a cross-sectional view of the typewheel and allied parts.

Fig. 27 is a front view of the printing and spacing commutator and associated parts.

Fig. 28 is a side elevation of the same.

Fig. 29 is a detail view of the commutator in cross-section, taken on line B—B.

Fig. 30 is a cross-sectional view of the commutator parts.

Fig. 31 is a plan view of the typewheel illustrating the various cams and check-ring.

Fig. 32 is a fragmentary detail view showing the return finger and paragraph cam in engagement.

Fig. 33 is a cross-section thereof on line F—F.

Fig. 34 is a fragmentary side view looking in direction of arrow "D," Fig. 31.

Fig. 35 is a similar view looking in direction of arrow "B," Fig. 31.

Fig. 36 is a like view looking in direction of arrow "E."

Fig. 37 is a fragmentary cross-sectional view illustrating the carriage return clutch, its allied parts and the contact finger operating the same.

Fig. 38 is a top elevation of the carriage return clutch.

Fig. 39 is a cross-section of the same.

Fig. 40 illustrates one end of the paper carriage and the paper feeding device.

Fig. 41 illustrates the other end of the paper carriage and the paper shifting device.

Fig. 42 shows the printing mechanism of my invention.

Fig. 43 is a side elevation of the same.

Fig. 44 is a top view of the same.

Fig. 45 is a plan view of the paper shifting device with parts broken away.

Fig. 46 is a top elevation of the ratchet device for shifting the paper.

Fig. 47 is a fragmentary plan view of the paper feeding mechanism.

Fig. 48 is a cross-sectional side elevation of the spring housing and allied parts.

Fig. 49 illustrates the method of making contact to stop the machine.

Fig. 50 is a similar view for paragraphing.

Fig. 51 is a top elevation of Fig. 49.

Figs. 52 and 53 are perspective views of the contact fingers.

Fig. 54 is a top plan view of the relay as used in my invention.

Fig. 55 is a side elevation thereof.

Fig. 59 represents the circuit make and break device used in accordance with my invention.

Fig. 60 is a top plan view of the same.

Fig. 61 is a cross-sectional view on line X—X, Fig. 60.

Fig. 62 is a like view on line Y—Y.

Fig. 69 is a circuit diagram using a single typewheel.

Fig. 70 is a fragmentary top elevation of the selecting parts using a hub or drum construction as applied to a double typewheel printing telegraph machine.

Fig. 71 illustrates the ratchet mechanism for the typewheel check-ring.

Fig. 72 is a cross-sectional view of a modified method of returning the paper carriage.

Fig. 73 is a view on line G—G of Fig. 72.

Fig. 74 is a similar view on line H—H of Fig. 72.

Fig. 75 is a like view on line K—K of Fig. 73.

Fig. 76 is a side elevation of Fig. 72 with parts broken away.

Fig. 83 shows the construction of the switch which alternately operates the printing magnets as used on a double typewheel printing telegraph machine.

Fig. 84 is a side elevation of the switchboard shown on Fig 83, the printing hammer parts removed.

Figure 1:
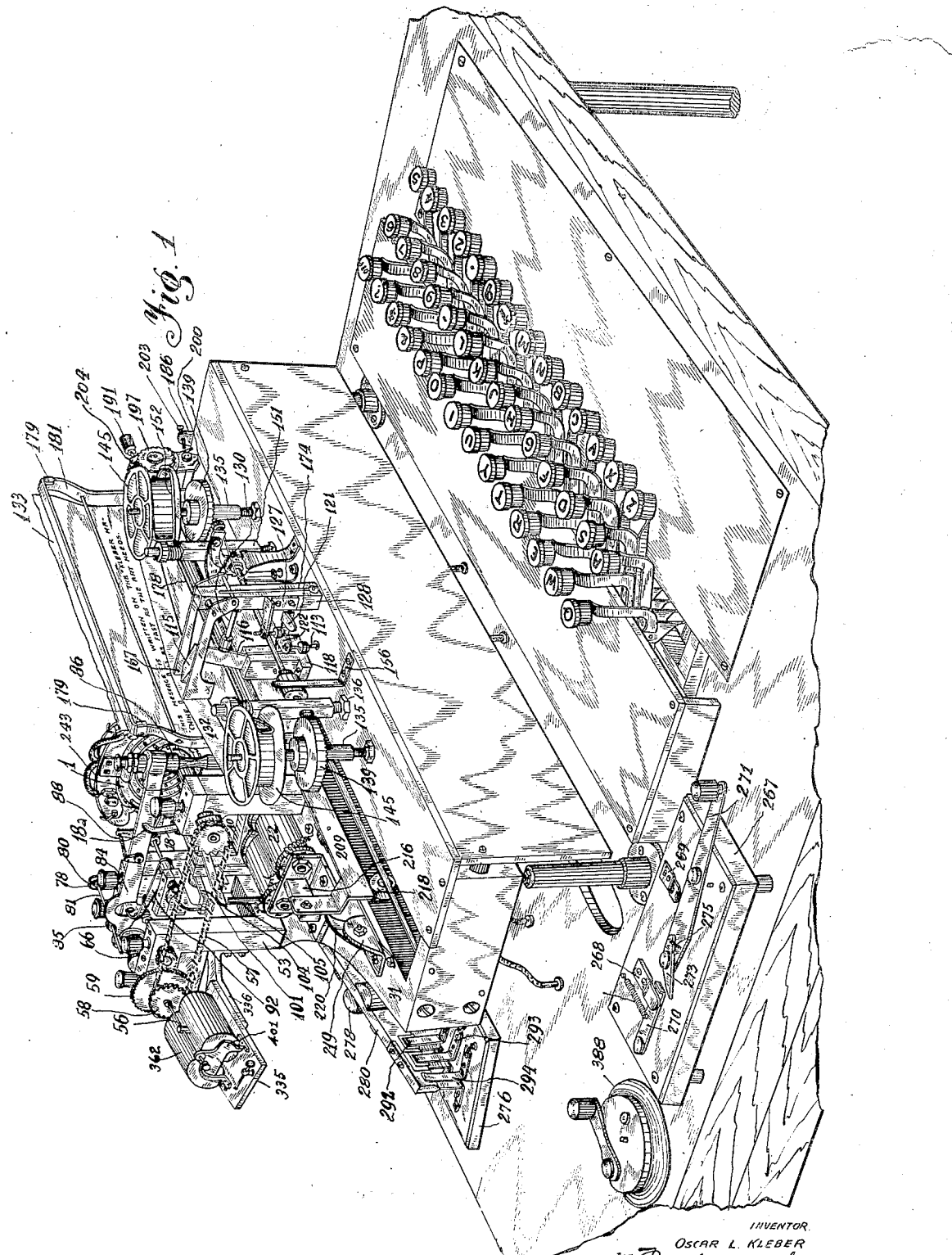
Fig. 1 is a perspective view, showing the receiver and sender and its various switches.
Figure 2:
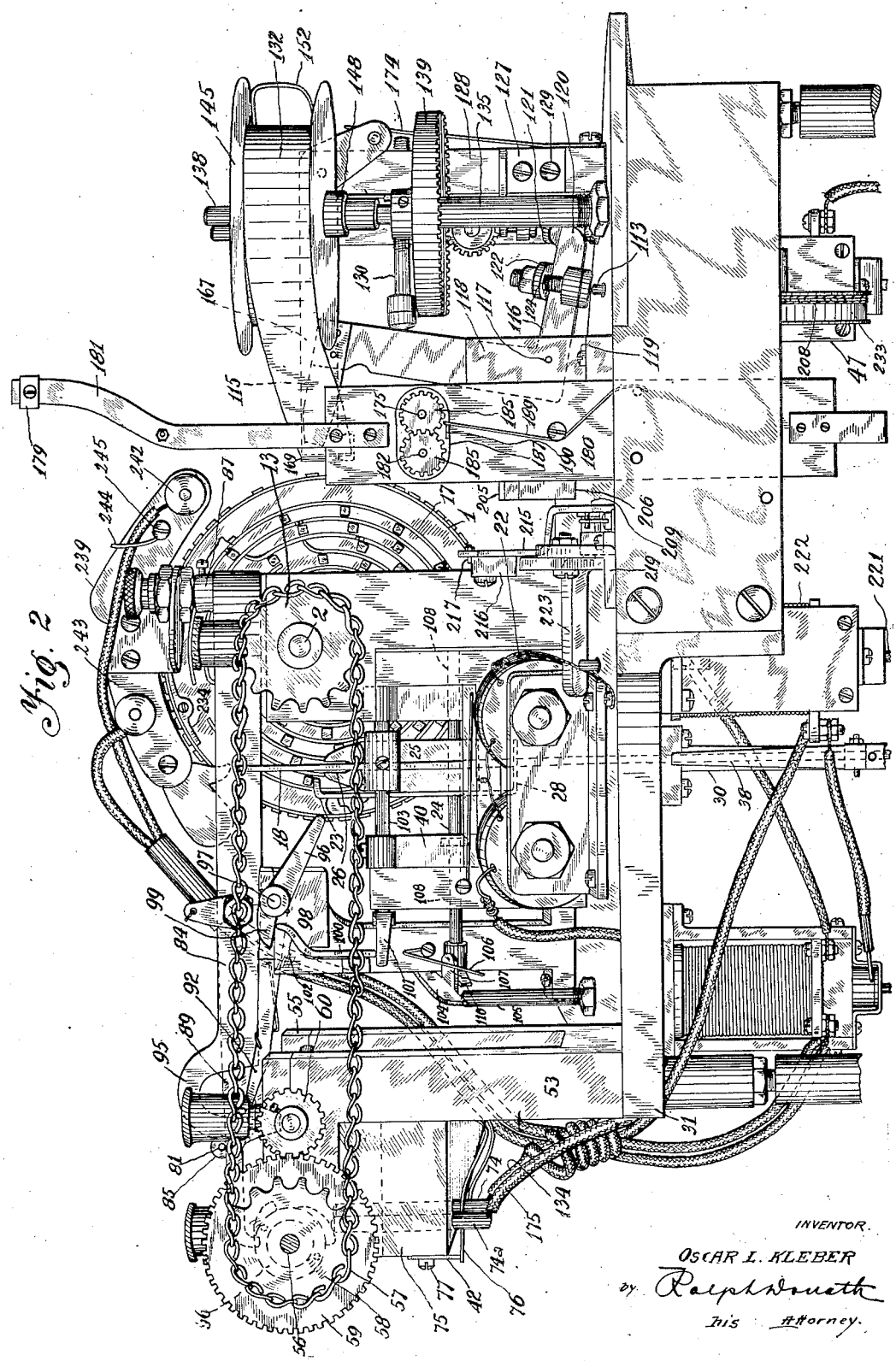
Fig. 2 is a perspective side elevation of the receiving apparatus.

For convenience I will describe my printing telegraph system, with reference to the different functions of the machine in the order in which they are performed as far as possible, i. e.—selecting, printing, ribbon shifting, spacing, paragraphing (paper shifting and spacing), transmitting, starting and stopping.

*Selection.*

As shown in Figs. 5, 6, 14 and 23, the typewheel 1 is loosely mounted on a continuously rotated shaft 2, said typewheel being normally held to rotate with the shaft by appropriate means, such as the electromagnetic means of my Letters Patent No. 1,145,490, issued July 6, 1915, or, as illustrated in said figures, by means of a friction disc 3, which is preferably made in one piece with the shaft 2, and an additional friction disc 4 which is placed against the inner side of the typewheel. The latter disc is adjustable by means of an adjusting collar 5, said collar comprising a sleeve 6 and a rigidly connected prong spring 8; the collar 5 being rigidly affixed to shaft 2 by a set screw 7, and said prong spring turning disc 4 by means of pin 9. A clearance as shown at 10 is provided between the inner concentric row of pins of the typewheel to allow for the free movement of the typewheel. The typewheel shaft 2 is supported by the bearings 11 and 12 and is provided at one end with a chain gear 13, which at the same time prevents longitudinal shifting of the typewheel. A fibre washer 14 is placed between the large friction disc 3 and the bearing 12 to insure proper alignment of the typewheel.

Figure 80:
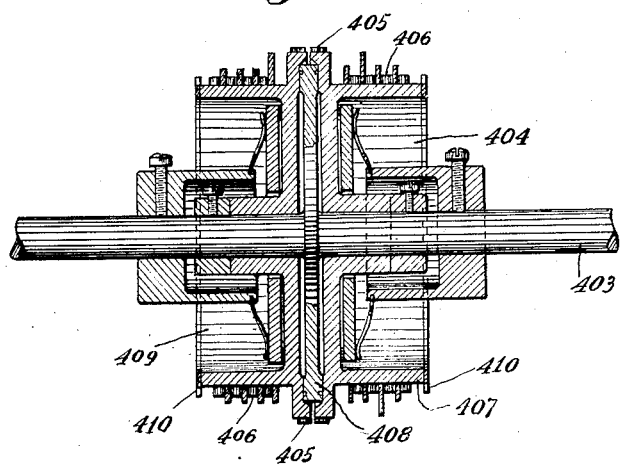
Fig. 80 is a cross-section of a double hub typewheel and associated parts.
Figure 81:
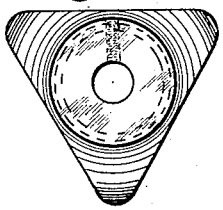
Fig. 81 is a detail plan view of the friction adjusting means as shown on Fig. 80.

As illustrated in Fig. 18, the typewheel consists of the disc 15, although, as shown in Fig. 80 and my prior patents, the drum or cylinder construction may be used, in which construction the guide rail and stop arrangement is substantially modified, as hereafter pointed out. Disc 15 is provided with four concentric series of laterally projecting stops 16, which I shall call "dot" stops. Four concentric guide rails 17 are provided between the stops 16 to prevent the "dot" finger 18, to be described later, from sliding into an inappropriate groove, as the space between guide rails may be called. Stops 19, which I shall call "dash" stops, may be formed as integral extensions of the guide rails, as shown in Figs. 18 and 19, but if desired the said stops may be located within the four rows of "dot" stops, the result being eight rows of pins instead of four as shown. Providing the guide rails with integral "dash" stops not only saves space and thereby reduces the diameter of the typewheel, but is of material advantage in insuring certainty of operation and simplicity of construction.

The forward ends of the guide rails 17, as considered from the direction of rotation of the typewheel, are arranged in stepped order and bent outwardly (or towards the periphery) to form a slide as indicated by the numerals 43, 50 and 46.

Inwardly extending from the home pin 41, which determines the initial or starting position of the typewheel, and connecting pin 83, which, being the last pin of the series, may be called the "return pin", is a long slide rail 20.

A similar rail 21 is provided to form a bridge from the second row of pins to the third row of pins.

The disc 15 is provided on its periphery with a plurality of letters or other symbols which are in a fixed radial relation with the stops, so that each stop represents a letter or symbol or blank space.

The dot and dash stops control the rotation of the disc by means of a selecting magnet 22, its armature 40, the "dot" finger 18, and the "dash" finger 23. The armature 40 is positioned so as to be attracted by the electro-magnet 22, which is intermittently energized and de-energized in response to received signals by the opening and closing of a sending circuit in accordance with the Morse code of signaling or any other suitable system, but preferably one in which impulses of the same direction or polarity are used.

The "dash" finger is mounted to oscillate and move longitudinally on a pivot rod 24, and the "dot" finger 18 is mounted to oscillate toward and away from the typewheel on pivot pin 39, and to move substantially radially of the typewheel upon shaft 32. These fingers are so arranged that when the "dot" finger engages the "dot" stops, the "dash" finger is in inoperative or in disengaged position, and when the "dash" finger is in an operative position the "dot" finger is in disengaged position; it will be noted that both fingers are always in parallelism in respect to the shifting movement. A strip 25 is rigidly fastened to "dash" finger 23 and a slot 26 is provided in said strip to receive the upper part of the "dash" finger 18. The lower portion of the "dash" finger is bent, as shown at 28, to form a rest on the "dot" finger. A bracket 27 fastened on the lower portion of the armature 40 is bent over the lower end of the "dash" finger to exert a flexible pressure on the "dot" finger. The upper end of the "dot" finger 18 has a hook-shaped extension 18$^a$, the purpose of which will be described later.

In order to provide a resilient mounting for the "dot" finger, to permit of a slight longitudinal movement thereof when it is engaged by a stop, the lower end of the "dot" finger is rounded and is provided with a slot 29; a bracket 30 located under the main frame 31 has a shaft 32 rigidly mounted in bracket 30. A bar 33 rockably mounted on said shaft is held in position by means of a loosely mounted distance sleeve 34 and a collar 35; said collar is provided with a set screw for adjusting purposes. The upper end of bar 33 has a slot 36 for the reception of the lower part of the "dot" finger.

When receiving signals, the rotating typewheel is checked and released intermittently very rapidly by the "dot" and "dash" fingers. In order to prevent wear and tear of the stops under this operation I have provided a flat spring 37, located in slot 36 directly below the dot finger 18, which spring has a tendency to relieve the blow on the finger by yielding and returning again when the typewheel is arrested at the selected position. A shaft 32 is secured in the rockbar 33 to allow the sliding movement of the "dot" finger. A suitable spring 38 is provided to force the finger toward the inner face of the typewheel.

To prevent the recoiling of the typewheel under rapid operation, which may result in the printing of an undesired character, I have mounted on the inner face of the typewheel a check-ring 112, which has on its periphery a number of ratchet teeth 113, preferably equal to the number of divisions on the typewheel; that is to say, if the typewheel has 60 spaces, (characters, numerals and blanks) the check-ring preferably has a corresponding number of teeth. Below the typewheel and fastened to the base is a flexible ratchet finger 114 which is in engagement with teeth 113 of the check-ring.

Referring to Figs. 14 and 23, I have illustrated the selecting mechanism in two different positions, Fig. 14 shows the "dot" finger 18 holding the typewheel in check and Fig. 23 shows the "dash" finger 23 checking the typewheel. As seen in these illustrations, when the "dot" finger moves toward the disc, the "dash" finger is moved away from it, and vice versa.

The typewheel being in its initial or home position, in Fig. 14, the "dot" finger is positioned between the inclined guide rail 20 and the outer rail 17 against dot stop 41, which may be called the "home stop".

I will now explain the operation of permitting the typewheel to rotate to a predetermined or selected position.

When a short electrical impulse or dot is transmitted over the line circuit, the "dot" finger 18 is momentarily lifted out of engagement with the dot stop, permitting the typewheel to rotate; now as this impulse is a short one this finger immediately drops back on the face of the disc and the typewheel continuing to rotate, forces the finger over into the next groove by means of the slide 43.

Assuming a Morse symbol of . . — . is to be transmitted, the operation is as follows:

The typewheel is held in its initial position by the "dot" finger and home stop 41, the first impulse lifts the "dot" finger momentarily as described above and it is then shifted over into the next groove by slide 43, to stop 44. The second dot following rapidly after the first, performs the same function and consequently thrusts the "dot" finger into the third groove by means of slide 50 to stop 45. The third impulse being a prolonged impulse or a dash, the "dot" finger is held out of engagement with all dot stops and slides and thus allows the slide 46 to pass underneath it, hence the fingers remain in the third groove and are not displaced radially.

The continued rotation of the typewheel is now stopped by means of the "dash" finger 23, by dash stop 49. It will be remembered that the fingers are interlocked to operate alternately in their movement toward and from the stops, and to be moved radially of the typewheel together, thus, when the armature pulls the "dot" finger out, it at the same time forces the "dash" finger in, consequently the typewheel will rotate to the point where a dash stop is positioned, in this case to dash stop 49. The dash impulse being completed, the armature returns to normal position and the "dot" finger being pressed inwardly, or biased to move in a direction to cooperate with the stops i. e. towards its arresting position. The final position of the character being a "dot," the "dot" finger is again lifted up and drops back in time to engage with the next succeeding "dot" stop 48. The typewheel has thus been permitted to move to the point determined by the signal . . — .

It will thus be seen that the degree of rotation of the typewheel, and hence the selection of a character, is determined by the groups and combination of dots and dashes, since the "dot" finger and its cooperating stops selects for dot impulses and the "dash" finger and its cooperating stops selects for dash impulses, and this selection is accomplished in the order of transmission.

It will also be seen that while either finger may, in accordance with the signal received, function to arrest the typewheel after a predetermined angular rotation, the dash finger selects the circle in which the fingers operate or in other words the series of stops with which it may cooperate to bring the wheel to rest.

The desired position of the typewheel having been obtained, I will now describe the

*Printing.*

Permanently mounted on the main base 31, by means of screws 52 is a bearing bracket 53, said bracket being provided with suitable bearings 54 and bearing caps 55. A shaft 56 rotates in the outer bearings and is driven directly by a chain 57 over the chain gears 58 and 13, as best illustrated in Fig. 5. Fixedly mounted on shaft 56 is a gear wheel 59 which meshes with the pinion 60, which pinion is rigidly fastened to the worm shaft 61, which carries the worm 62 held permanently on the shaft by a pin 63. A collar 64 held on the shaft by the set screw 65, is provided to prevent a lateral movement of the shaft 61. Centrally located and loosely mounted on a shaft 56 between the outer bearings, is a two cam commutator or rotating switch 66, in frictional connection with a flanged collar 67, on one end and an adjustable friction disc 68, on the other end, so as to keep it at a desired tension.

Referring to Fig. 30, the rotating switch 66 consists of a hollow cylinder 69 with a circular ridge 70 at each end. Contact cams 71 and 71ª are fastened on each of said ridges in any suitable manner and located circumferentially in close proximity, preferably not more than 90° apart (see Fig. 28). Between the two ridges, stop pins 72 and 73 are provided to cooperate with the cam-shaped contact surfaces 71 and 71ª. Directly underneath the said contact surfaces 71 and 71ª are the brushes 74 and 74ª which slide in the insulated bar 75, and are cushioned by means of springs 76. To retain the brushes in proper position I provide flat plates 42, each held in place by a screw 77. A flexible wire 134 connects the brush 74 to the proper terminal of solenoid 47, the other end of said solenoid connects to the positive side of generator by wire 231.

Referring again to Fig. 5, there is shown between the bearings 55 a supporting strip 78, fastened to bearing bracket 53 by means of screws 79, the upper end of said strip having an open slot 80 to receive a long pin 81, which pin is held rigidly in the desired position by the nuts 82. To limit the swinging movement of a long arm 84 I provide a collar 85 which is held firm on the long pin 81. Long arm 84 is mounted to oscillate on a supporting rod 86 held from vertical movement by the collar 87 and nuts 88ª. The extreme forward end of said arm 84 is bent downwardly to engage or release the commutator stop pins 72 and 73, when in operation.

A coil spring 88 and proper supports for the same is provided to return the long arm 84 to its normal returned position, as shown in Fig. 5. Pivotally mounted on said arm 84 is the timing lever 89, said lever having a pendant portion 90 terminating to a knife edge 91 which coacts with the worm 62 at predetermined times.

Adjacent the knife edge part of the timing lever 89, the arm 84 is bent upwardly, as designated by the numeral 95, to make room for the movement of the rectangularly bent portion of the lever 92 which cooperates with the timing lever 89 by means of the oblong slot 9ª in said timing lever 89.

As best seen in Figs. 5 and 32, lever 92 is fixedly mounted on a rock shaft 97. Lever 96 is also fixed to the rock shaft 97 opposite lever 92 and is so placed as to coact with the cam 234 on the inner face of the typewheel, as will be explained hereafter. The rock shaft 97 is loosely journaled in bearings 98 and held from lateral movement by a finger 99, which is pinned to the rock shaft 97. Directly underneath finger 99 is the upturned end 102 of an intermediate lever 100 which cooperates with finger 99 and the pawl lever 101, the last mentioned pawl lever being rigidly mounted on the armature shaft 103 of the selecting magnet.

Parallel to lever 100, an additional lever 104 is provided, which rests when in inoperative position on an upright pin 105, and is held downwardly by means of a spring 106 on the extension 107 of the lever 104.

Shaft 24, on which the dot and dash fingers are slidably supported in the bearings 108 of bracket 109, has an extension, on which is carried the lifting finger 110 and is held in proper relation to the lever 104 by screw 111.

Having described in detail the cooperating parts which effect the printing, I will now explain the operation of the same.

Referring again to the symbol ..—. before described, the desired position of the typewheel having been obtained, the selecting magnets 22 are deenergized and the typewheel therefore returns to normal position; as soon as this occurs the knife-edged lever 89 falls into the groove of the rapidly rotating worm 62 and the long arm 84, which operates in harmony with the knife-edged lever 89, is carried laterally thereby releasing the pin 72, and the commutator 66 normally held in frictional engagement revolves and the contact cam 71 makes contact with the brush 74 thus energizing the printing solenoid 47 (see Fig. 42). The mechanism thus results in interposing a time delay between the completion of the selecting operation and the operation of any mechanism, e. g. printing, which may be controlled by the rotating switch, and delays the action of the subsequently operating mechanism to permit the operation of the mechanism in proper sequence. It will also be noted that the completion of the selecting operation initiates the action of the mechanism which ultimately results in the operation of the subsequently operative mechanisms, as, for instance, printing, which operation is effected independently of the selecting mechanism and while the latter is at rest.

The current operating the printing solenoid 47, as well as all the magnets or solenoids of this machine, is supplied from a local source of energy as, for instance, the generator (see Fig. 69) 227 of a motor generator set 228. Said current travels over wire 372 from the positive terminal through printing magnet 47 and to contact 74 to contact 71 and to the ground. It is to be understood that said motor generator set is running as long as messages are sent or received, and, as will be described later, the same is automatically started and stopped.

The negative pole of the generator is grounded by wire designated by the numeral 229.

It should be mentioned that said knife-edged lever 89 has always the tendency to engage the groove in the worm when impulses are sent, but is disengaged when no impulses are sent over the wire. It is to be understood that since the said lever 89 is operated under the influence of the selecting magnet, it is brought out of engagement of the worm during every impulse, so that no printing will take place.

The energizing of solenoid 47 causes the plunger rod 113 to be raised, thereby lifting the L-shaped printing bar 114, which has on its upper end securely fastened the printing head 115, to make a printing impression.

Referring to Figs. 42, 43 and 44, the printing mechanism comprises the Z-shaped printing hammer 116 which is pivotally mounted at 117 in the supporting bracket 118, and held to the base by screws 119. The lower end 120 of the printing hammer 116 has two angularly disposed extensions 121 and 122. Extension 122, located directly above plunger 113, has a tapped hole 124 in which the threaded shank of the abutment knob 94 is securely held by the locknut 125. A similar abutment knob 126 is placed on bracket 127, the latter being secured by means of screws 129 to a standard 128. An additional abutment knob 130 held rigidly on said standard 128 by the locknut 131, is provided, which also serves as an adjusting nut.

As best seen in Fig. 43, the printing mechanism operates as follows:

As described before, the solenoid 47 being energized through the operation of the delayed action mechanism, the plunger 113 is raised up, thereby forcing the hammer 116 to strike the symbol selected, on the typewheel. Between the face of the typewheel and the printing head of the hammer 116 is a typewriter ribbon 132 and the paper sheet 133; and it is obvious that the desired character will be printed on the paper sheet, when the hammer strikes the character through the ribbon onto the paper.

The proper character being printed, I will now describe the operation of

Type ribbon shifting.

The ribbon shifting mechanism is one of the mechanisms operating subsequently to the completion of the selecting operation under the control of the delayed action mechanism. It may be operated in a number of ways, it being only necessary that it shall not operate at the same time as the printing mechanism, and it is therefore preferable to so arrange the rotating switches controlled by the delayed action mechanism so that it and the printing mechanism will operate sequentially. It may also be connected to operate with other mechanism which acts at the proper time with respect to printing as, for instance, the spacing mechanism, and it is so shown in Fig. 69.

Referring to Figs. 12, 13 and also to Figs. 42, 43 and 44, the ribbon shifting mechanism comprises vertical supporting rods 135; the lower ends of which may be threaded, and screwed into the main base and held rigidly by lock nuts 136. A centrally located aperture 137 in said supporting rods 135 is provided for the reception of the shafts 138, which are rotatably inserted in said apertures 137. Shafts 138 carry crown wheels 139, adapted to mesh alternately with the pinions 140 and 141, which pinions are mounted on the ends of a horizontal shaft 142 which rotates in the bearings 143 and 144. Spools 145, which rest on the collars 148, carry the inking ribbon 132. Collars 148, have inserted at the upper face a pin 149, which passes through the aperture 150 in the lower flange of spool 145. The inking ribbon 132, which is wound around the drum of the spools 145, is alternately wound upon said drum, depending on the location of the pinions 140 and 141, in a manner similar to ordinary typewriters.

Square upright bearing posts 151 are rounded at their upper ends for the reception of springs 152, which surround the rounded part of the posts and terminate in a rectangular-shaped portion which bears on the inking ribbon 132, as plainly illustrated in Fig. 12.

Fixed to the upright shafts 151 and located above the coiled part of the spring 152 is a collar 153, which serves as a retainer for said spring. Rigidly mounted on the horizontal shaft 142 and positioned near the post 151 is a sleeve 154, which has a centrally placed rib 155 for the purpose of shifting the pinions 140 and 141 into or out of engagement of the crown wheels 139. A leaf spring 156 bearing against one end of sleeve 151 and fastened by screw 157 to the base, acts as a retainer to keep either of the pinions in or out of mesh with the crown wheels, so as to wind or unwind the ink ribbon 132 from one spool to the other.

A solenoid 158, similar to that used for the printing operation, is mounted underneath the base and the plunger 159, when energized at the proper moment, is raised up, thereby moving upwardly a tilting plate 160, of which the lower part is bent at an angle as at 163 to form an abutment for the plunger knob 161 of the plunger 159. A bracket 162 is provided in close proximity to the bent part 163 of the tilting plate 160, which acts as a limiting means when said plunger is raised up rapidly. A ratchet wheel 164 is pivotally mounted on the shaft 142 and a swingingly mounted pawl 166, yieldingly held against the teeth of the ratchet wheel 164, is provided to cause the ratchet wheel 164 to be turned the distance of one tooth every time the solenoid is energized.

An S shaped flat spring 165 is provided to engage with a tooth of ratchet wheel 164, as a matter of safety, to prevent the pawl 166 from moving the ratchet wheel 164 more than one tooth.

The centrally located standard 128 carries the ribbon guide 167, which consists of pivotally mounted arms 168. The front end of said arms is adapted to receive the inking ribbon 132 through a vertical open slot 169, and the lower parts of said arms are held firmly apart by a pin 170 and a thimble 171. The rear ends of said arms 168 are bent downwardly and the same means are provided to hold the arms apart as on the front end. Arms 168 are pivotally mounted in the standard 128 at the junction of the arms and the downwardly bent end, on the pin 172, and two sleeves 173 are placed between the standard for keeping the inking ribbon guide properly spaced.

The ribbon guide is held in its normal horizontal position by the spring 174.

When it is desired to read the writing on the paper the ribbon guide is moved downwardly by pressing slightly the top of the front part of said guide arms and the last line of writing will thus be visible, it being understood that when released the said guide returns to normal position.

The operation of the parts just described is as follows:

The desired character having been printed on the sheet of paper and the delayed action mechanism having operated to release the pin 72 from the downwardly bent heel of arm 84, the commutator 66, which is in frictional contact with the shaft, turns until stopped by the pin 73, thereby causing the brush 74ª to make contact with contact 71ª energizing the solenoid 158. Solenoid 158 is, in the particular modification described, connected in parallel with the spacing solenoid, and the spacing will therefore take place at substantially the same time as the ribbon shifting.

Immediately after solenoid 158 is energized, the plunger 159 is raised up, thereby raising the tilting plate 160, and pawl 166 is brought out of engagement with the teeth of the ratchet wheel 164; as soon as the plunger drops down, the tilting plate returns to normal position, the pawl engages a tooth and turns the ratchet wheel 164 a distance of one tooth. As the said ratchet wheel is rigidly mounted on the horizontally disposed shaft 142, it is evident that the pinion 141 will also revolve, causing the crown wheel and the spool to turn, thereby winding the inking ribbon 132 on the drum of spool 145.

By merely lifting leaf spring 156 and shifting the shaft 142 toward the post 151, pinion 140 will be brought in mesh with crown wheel 139 and the ribbon will be reversed and wound on spool 145.

The flexible conductor 227 connects terminal 226 of the spacing magnet and brush 74ª. The positive pole of the generator is connected to the binding post of ribbon shifting magnet 158 by wire 230, the other binding post of solenoid 158 being connected to binding post 226 of solenoid 222 and then by wire 175 to brush 74ª over contact 71ª to ground.

*Paper carriage and the shifting of the same.*

Referring now more particularly to Figs. 7 to 11 inclusive, and also to Figs. 37, 40, 41 and 45 to 48 inclusive, the paper carriage 176 is slidably supported by longitudinally extending round bars 182, which are rigidly mounted in the end brackets 184 and 184ª.

Two guide plates 177, flared at the top and bottom, are spaced apart to receive the paper freely. Said plates are riveted at the end to the supports 180. On the upper parts of said supports a U-shaped frame 181 is provided, which carries the guide strips 179. Yieldable rubber-covered rollers 178 are rotatably mounted in the supports 180. The rollers 178 are pressed upon a shaft 182 and 175 and placed side by side for the reception of the writing paper 133. Meshing gears 185 are fixedly mounted on one end of the rollers, and an oblong washer 187 is placed between these gears and the support 180. An oblong slot 188 is provided in washer 187 to allow the one roller to yield, when so desired, especially in a case where more than one sheet of paper is used. Spring 189, of which the upper end rests on a laterally projecting pin 190, is in yielding engagement with said washer 187.

One of the rollers 178 has a shaft extended for the reception of a knurled knob 191, and between said knob and the oblong washer 194, I provide a bevel gear 192 that meshes with another bevel gear 193. A similar oblong washer 194 is provided on the opposite side of washer 187 for the purpose as described above.

Rigidly fixed on the support 180 is an outboard bearing bracket 195 in which the bevel gear shaft 196 is rotatably mounted and adapted to hold rigidly the bevel gear 192 on one side of the bracket 195, and a ratchet wheel 197 fixed to said shaft on the other side of said bracket.

Between the ratchet wheel 197, and the hub of the bevel gear 193, is loosely placed the rock plate 198. A coil spring 199 is fastened at one end to support 180 and at its other end to the upwardly extending lip 204 of the rock plate 198. A pawl 200 is pivotally hung on a pivot screw 201 and the pointed part of the same is in engagement with a tooth of the ratchet wheel 197. An outwardly projecting abutment arm 202 on pawl 200 is provided to make a mechanical contact with pin screw 203 at a desired time, the latter being adjustably mounted on an upright bar 186 and said bar on the side of the bracket 184.

In parallelism with rollers 178 slightly underneath the same I provide a spur gear rack bar 205, and directly below the same is a like rack bar 206, preferably of the ratchet tooth type. As shown in Figs. 7, 37, 40 and 47 both rack bars are fastened to the edge of the supports 180.

The paper carriage has the tendency to move forward under the influence of a clock spring in 233. On the periphery of said drum is a groove 207 around which passes a cord 208. One end of said cord is tied to support 180 and the other end to the drum 233; to obtain the proper direction the cord is brought over pulleys 146 and 235.

The aforesaid construction of the tensioning means is well illustrated in Figs. 7 and 8, and as the same is commonly used, a further description will be unnecessary.

Referring now more particularly to Figs. 45 and 46, the L-shaped rock arm 209, which cooperates with a lever pawl 210, and the rack bar 206, is journaled in bearing box 211 on screw pin 212. The lever pawl 210 is held in yielding engagement by spring 213, of which the rear end is inserted in the aperture 214 of rock arm 209. The short upright leg 215 of said rock arm 209, on which is loosely hung a weighted dog 216, is slightly bent outwardly. Pin 217 is provided to maintain the said dog in horizontal position. When the rock arm 209 is in normal position, the same rests on a rest block 218.

219 designates a bracket in which is rockably mounted the trip dog 220, which trip dog consists of two arms; the lower arm being bent to form an abutment portion 223 for the plunger 221 of the solenoid 222, said trip dog 220 being yieldingly retained, when in normal or resting position, by a spring 224. The other arm of the trip dog 220 terminates in a sharp cornered tooth 225.

Spacing solenoid 222 is connected in the same manner as solenoids 47 and 158 to wit: current enters from positive pole of generator over wire 372, through solenoid 222 to terminal 226, and to brush 74$^a$, and then to cam 71$^a$ to ground.

It is apparent that inasmuch as the spacing and ribbon-shift solenoids are connected in parallel and actuated from the same brush (74$^a$), the spacing of the paper sheet and the shifting of the inking ribbon takes place at substantially the same time.

Referring again to Figs. 7 and 37, the paper 133, which is preferably on a roll, is inserted through the open flared slots 232, then between the guide plates 177, through the usual rollers 178 and the guide bars 179.

The operation of the shifting of the paper carriage is as follows:

As heretofore explained, the spacing solenoid 222 is energized at the same moment as the ribbon shifting solenoid 158 and by the same brush 74$^a$ and contact 71$^a$. The instant this has occurred, the plunger 221 is raised up, thereby moving the rack arm 209 upwardly by means of trip dog 220 and the weighted dog 216, thus releasing the toothed end of lever pawl 210 from its engagement with a tooth of rack bar 206. The paper carriage being under the tensional influence of a clock-spring in drum 233, is now sliding toward the opposite end of the tensioning means, and as the solenoid 222 was only momentarily energized, the plunger 221 has returned to its normal position and the lever pawl 210 again has engaged a tooth of rack bar 206, thus holding the movement of the paper carriage in check until the next character is sent.

It is obvious that the pitch of the teeth on rack 206 corresponds to the distance or space between the characters when typewritten on paper.

The operation of returning the typewheel to its home or initial position and of returning the delayed-action mechanism to normal, is as follows: It will be remembered that the knife-edged lever 89 is moved into and out of engagement with the worm under the influence of the selecting magnet so that as long as signals are being received it is given no substantial movement along the worm 62, but that when signals have ceased to be received, the knife-edged lever 89 is allowed to remain in contact with the worm for a sufficient time to enable it to be moved along the worm sufficiently to move the long arm 84, so that it will release the rotating switches controlling the mechanisms operating subsequently to the selecting operation. Immediately after the long arm 84 has been operated to release the switch controlling the printing magnet, the further rotation of the worm causes it to engage the extension 18<sup>a</sup> of the "dot" finger 18 to withdraw the "dot" finger from engagement with its cooperating stop on the typewheel, thus permitting the typewheel to be rotated toward its home position. As the typewheel approaches its home position, the segmental cam 234 mounted upon the typewheel engages the finger 99, fixed on shaft 97 to which lever 92 is also fixed, thus raising the knife-edged lever 89 out of engagement with the worm where it remains until the selection of the next character is started and permitting the long arm 84 to be returned to its normal position under the influence of spring 88. This return movement of the long arm 84 releases the "dot" finger, permitting it to return to the home stop 41 on the face of the typewheel.

Blank spaces on the typewheel are provided in order to prevent printing when the typewheel is brought to positions appropriate to the spacing, paragraphing and "off" operations.

*Returning the paper carriage.*

The return of the paper carriage at the end of a line or paragraph is controlled through a contact cam 228 on the face of the typewheel, which is so constructed as to only make contact when the typewheel is momentarily stopped at a predetermined point which corresponds to the paragraph key on the transmitter. By reference to Figs. 49 to 53, 31-34 to 36 of the drawings, it will be seen that the non-conductive cam 228 (see Fig. 31) comprises an inclined front end 236 and a slightly raised rear end 237. Adjacent said rear end is a contact pin 238 arranged below the surface of contact, so that when the contact pawl 239 momentarily stops at this pin a contact is made which energizes the solenoid 240 (Fig. 37) thereby raising plunger 241. Contact pawl 239 is loosely supported by a pivot screw 242, on bracket 243, of non-conductive material which is held rigidly on top of supporting rod 86 (Fig. 6) by nuts 88<sup>a</sup>. A screw 245 is provided which holds one end of spring 244 and at the same time acts as a rest for the contact pawl 239 when the same is in normal position, spring 244 being in yielding contact with said pawl 239. The relation of the speed of the typewheel and the inertia of the contact pawl is such that when the typewheel is rotating the contact pawl cannot fall into the depression on cam 228, and thus does not make contact unless the typewheel is brought to rest at the proper position.

Coacting with the mechanism aforesaid for returning the paper carriage is a clutch 246 (see Figs. 37, 38 and 39), the latter consisting of a loosely mounted 90° spiral gear 247, on the side of the hub of which gear are inserted pins 248.

Shaft 249 is revolubly mounted in bearing box 250, and on the inner end of said shaft is fixed the rack pinion 251, which meshes with the rack bar 205 of the paper carriage.

Fixed to the outer end of shaft 249 is a female clutch member 252, the flanged part of said clutch member having two oppositely placed apertures 253, into which the studs 254 of the male clutch member 255 are inserted.

The male clutch member 255 is slidably mounted on a shaft extension 256 by means of the grooved end 257, which is adapted to receive the forked angle lever 258. It will be noted that the studs 254 are always in engagement with aperture 253, as shown in Fig. 37. Fig. 39 shows these studs out of the aperture so as to obtain a clear view of the general construction of the same.

Spiral gear 147 is fixed to the typewheel shaft 2 and is in mesh with the spiral gear 247, and as the said shaft 2 is continuously rotating when the machine is in operation, spiral gear 247 is rotating freely on shaft 249.

When the combination of impulses appropriate to position the typewheel in the paragraphing position are sent, the typewheel is brought to a momentary stop at a predetermined position, so as to bring the contact pawl in alignment with contact pin 238.

Immediately after contact finger 239 makes contact with pin 238, solenoid 240 is energized, plunger 241 lifts angle lever 258, whereby the clutch is moved inwardly. Fig. 38 shows the clutch with the studs 248 and 254 in engagement, and it will be seen from the illustration that when said clutch engages these studs the spiral gear will now carry along the rack pinion 251, returning the carriage to the beginning of a line.

Attention should be called to the fact that contact pin 238 is only in momentary contact with pawl 239 because of the fact that the delayed action mechanism has acted immediately after the cessation of the impulses positioning the typewheel at the paragraphing position to trip the "dot" finger and permit the typewheel to be moved home, and therefore the plunger 241 of solenoid 240 would drop back and the clutch disengage were not means for continuing the operation provided. To prevent the clutch from disengaging until the paper carriage is fully returned to its normal starting position, I provide a yielding contact plate 259, which is mounted on an insulating block 260, which acts as a means of continuing the contact until the carriage is at the desired returning position. When this has been accomplished, contact is broken on switch lever 261 by an insulated extension arm 262 which is fastened on the end of rack 205. At the same time abutment arm 202 strikes the pin 203, thus swinging the pawl end of arm 202 to move the ratchet wheel 197 up the required number of teeth and through bevel gears 192 and 193, the former being turned by ratchet wheel 197, the rollers 178 being turned and the paper thus fed up one line. Should it be desired to feed the paper up two or more lines, the same process may be repeated two or more times.

The electrical connections are illustrated in the diagram Fig. 69, in which wire 263 connects to lever 261 and wire 264 to positive side of generator. Wire 265 connects from solenoid 240 to contact finger 239, wire 266 connects from the same terminal of solenoid as wire 265 to contact plate 259.

*Starting.*

Figure 56:
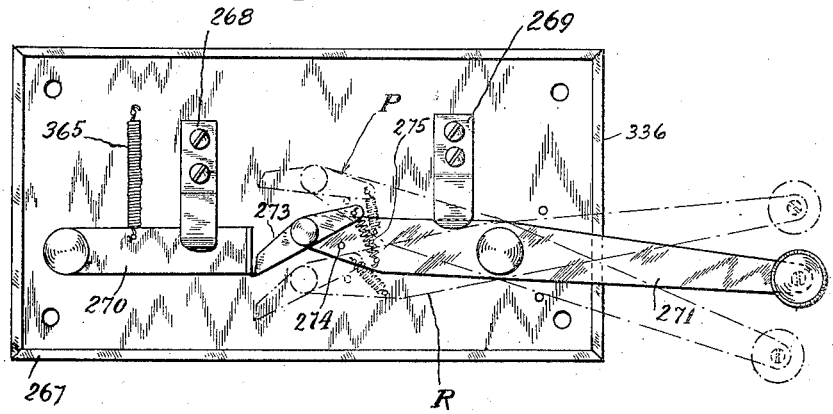
Fig. 56 is a top plan view of the starting switch, used in connection with my invention, showing in dot and dash lines the different positions of the operating lever.
Figure 57:
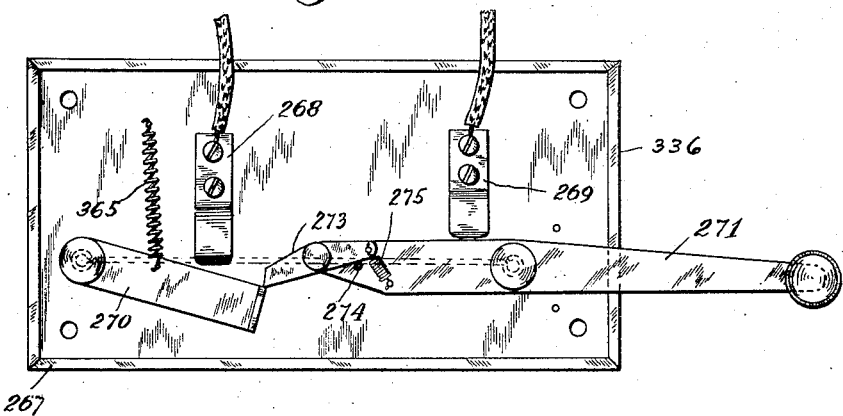
Fig. 57 is a like view showing the operating lever breaking the circuit.
Figure 58:
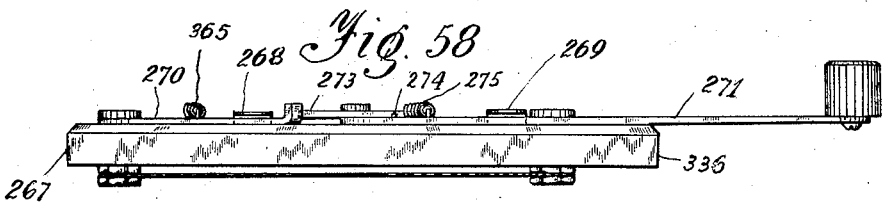
Fig. 58 is a side elevation of the same.
Figure 63:
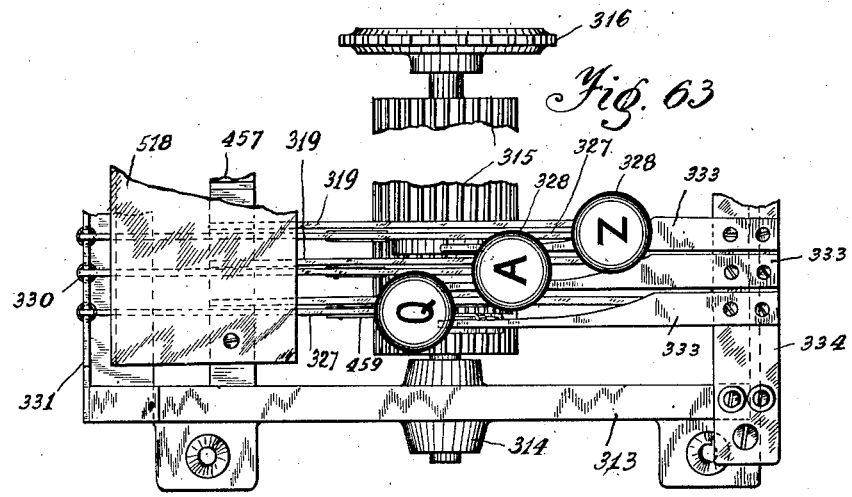
Fig. 63 is a fragmentary top elevation of the keyboard or sender.
Figure 64:
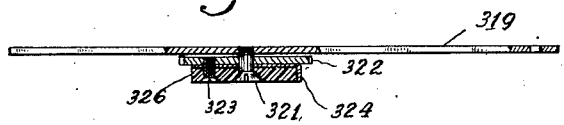
Fig. 64 is a top elevation of the contact gear and the support for the same.

To start machine, I provide an electric switch (Figs. 56, 57 and 58) which consists of a base 267 of insulating material on which are mounted the resilient contact jaws 268 and 269. When in normal position yielding finger 270 makes contact with contact jaw 268, and the operating lever 271 is at the position indicated in dot and dash lines and by the letter "P" (Fig. 56). A tripping finger 273 is normally held against a stop pin 274 by a yielding coil spring 275.

When it is desired to send a message from any given transmitter, the operating lever 271 must be at the position indicated at "P" at all stations, excepting the transmitting station at which the lever 271 must be in the position indicated at "R". A knife switch 276, illustrated in Figs. 59 to 62, cooperates with aforesaid starting switch in a manner I will describe at the proper time.

The knife switch 276 includes a suitable base 277, at the central portion of which is a post 278, in the upper bifurcated end of which is mounted a beam 279 adapted to move about a horizontal axis extending transversely of the base. One end 280 of this beam is normally held depressed by a tension spring 281 attached thereto and to the base so as to bias the switch to close the circuit through a contact strip 282 secured about the lower portion of the arm and two resilient contact jaws 283 secured to the base.

An auxiliary knife switch 382 is positioned beneath arm 280 adjacent to post 278, the blade 272 of this switch being mounted on angle bracket 284 secured to the base and engaging the jaws 285, also secured to the base. Blade 272 is normally depressed by a wire spring 286, and when arm 280 is depressed a plate 287 secured thereon contacts with the upper edge of the switch blade so as to prevent accidental opening thereof.

The other arm 288 of beam 279 is provided with three spaced contact strips 289, 290 and 291, similar to strip 282, which engage between pairs of resilient jaws 292, 293 and 294 when this end is depressed.

An angle plate 295 is secured on the side of arm 288; the lower arm 296 of this plate being positioned to be engaged by the head 297 of an angle latch lever 298 when arm 288 is depressed to hold the switch beam against the tension of the biasing spring.

Lever 298 is mounted on a bracket 299 secured to the base 277 and the upper arm 300 is normally forced toward arm 288 by a leaf spring 301 secured to the base. The lower arm 302 of lever 298 is provided with an offset or lug 303 positioned in alignment with a plunger 304 of a solenoid 305 supported by a bracket 306 secured to the underface of base 277. The plunger 304 operates through a suitable opening 307 provided in the base for this purpose. A similar solenoid 308 is supported by a bracket 309 at the opposite side of post 278 from solenoid 305. Plunger 310 of solenoid 308 operates through an opening 311 in base 277 and, when raised, strikes a lug 312 depending from switch blade 272 so as to open the switch.

The switch 276 is intended to be used in connection with a transmitter (which will be later described), a receiver such as illustrated and described above, which comprises suitable selecting, spacing, paragraphing, receiving and printing means, which are energized at proper times during the operation of reproducing or printing a message and the local sources of energy. These various magnets and associated mechanism are indicated diagrammatically in Fig. 69.

Normally the beam 279 of the control knife switch is in the position indicated by the broken lines in Fig. 59, arm 288 being depressed, and lever 271 in the dot and dash line position as indicated by letter "P" in Fig. 56. The current from the main line flows from wire 370 to auxiliary relay 371, wire 366 to jaws 293 of switch 276 to contact finger 270, contact jaw 268, wire 363, magnets 362 of relay and to the other main line wire 361, thus energizing magnets 362 so as to normally hold armature 401 closed. By momentarily breaking this circuit at the sending station, the armature is permitted to drop, thus closing the circuit of battery 386 through wire 387 switch 388, wire 389, terminal 390, lead 391, support 342 to screw 343, leads 393 and 392, wire 379, lead 381 bracket jaw 284, knife blade 272, lead 383, solenoid 305; wire 384, jaws 294 and wire 385 to the other side of the battery 386. This energizes solenoid 305 raising plunger 304 so as to release the latch holding arm 288 of beam 279 which is rocked by spring 281 into the position illustrated in Fig. 59, thus closing the circuit of the motor to connect the primary source of energy thereto. After this has been done impulses may be sent over the main line, which is now an open circuit, through wire 402 lead 364, jaw 269, operating lever 271, lead 369 contact finger 270 and jaw 268, wire 363 to main line relay.

To send a message, operating lever 271 is slowly moved from its normal position into the position "R" (see Fig. 56). This movement of the lever moves member 270 out of contact with member 268 thus breaking the circuit of magnets of the relay momentarily so as to close the motor circuit in the mannner previously described. Member 270 is returned by spring 365 into contact with member 268 so that the transmitter, which is on open circuit, is connected into the main line in series with the relay.

*Transmitting.*

The transmitter illustrated in Figs. 63 to 68 used in conjunction with my telegraph receiving machine consists of properly supported side frames 313, in which is rotatably mounted in bearings 314, a long pinion 315. A shaft extension is provided on one end of said long pinion 315, on which is keyed a chain wheel 316, for the reception of a chain. The said pinion is, when sending messages, continuously rotated by a suitable electric motor, preferably one which is directly connected to the generator which furnishes the local current for the several magnets or solenoids, supplied from the local source.

Figure 65:
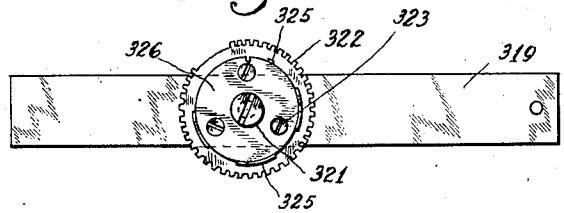
Fig. 65 is a plan view of the same.

Between the side frames 313 are fastened the two long bars 147 and 320, and a series of slots 317 and 318 which correspond to the number of characters are provided in said bars 147 and 320 in alignment with each other. In each of slots 317 and 318 are inserted the gear supporting strips 319 which are pivoted in the slots of bar 147 by a long common pin 399. On the side of said strip 319 and rotatably held by a bearing screw 321 is a mutilated gear 322 on which is fastened, by means of screw 323, a circular metal disc 324, said disc having laterally extended long or short contacts 325 bent over on insulating disc 326. The said contacts represent the Morse characters, and Fig. 65 shows one of the same consisting of one dot and three dashes. As it is necessary to wait a reasonable time for this mutilated gear 322 to make a complete revolution before sending, the group of contacts can be duplicated or triplicated on this disc, so as to complete a character in less than one revolution, thereby reducing the time one-half or one-third, depending on the number of groups of dot and dashes, representing characters, on said mutilated gear. It is obvious that after each group of contacts representing a character, a number of teeth are removed from the gear 322 for the purpose of rendering the same inoperative.

In parallelism with the gear supporting strips are the upwardly bent key levers 327 on which are fastened finger pieces 328. Said key levers have on the rear end an aperture 329 for the reception of the end of a coil spring 330. The remaining end of said coil spring is placed in the aperture 332 of an angle plate 331, which is rigidly mounted on both side pieces 313.

Key levers 327 are pivoted in a slotted bar 457 upon a long pin 458 common to all levers.

Figure 66:
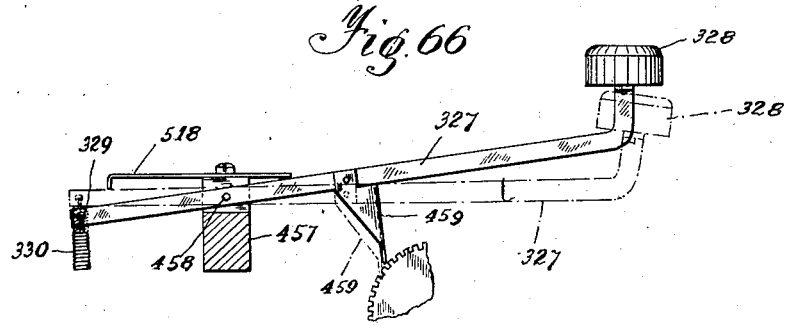
Fig. 66 is a detail view of the operating key showing in dot and dash lines the pawl engaged with the contact gear and the operating key depressed.
Figure 67:
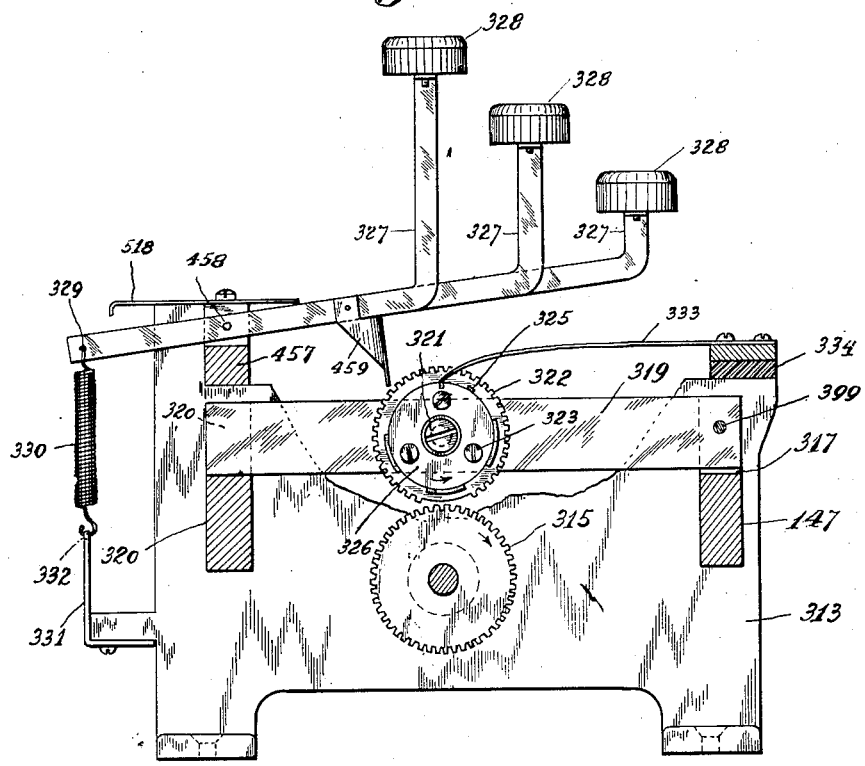
Fig. 67 is a side elevation of the sender with parts of the frame broken away.
Figure 68:
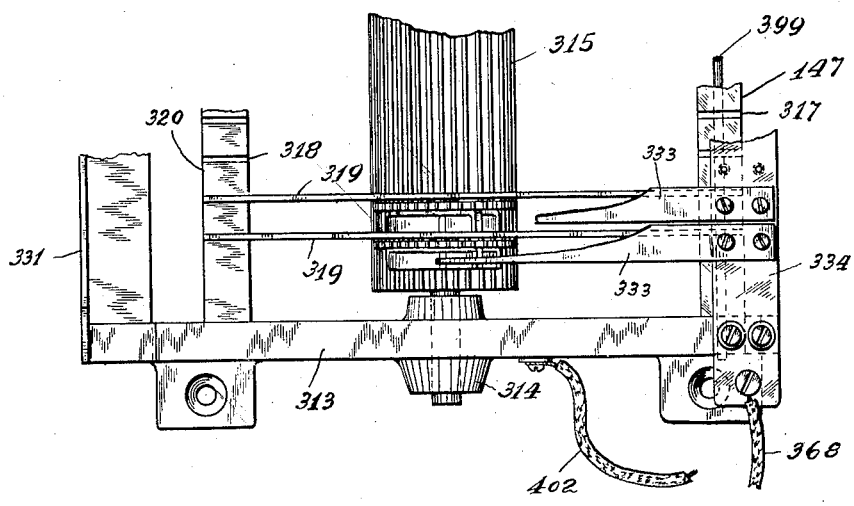
Fig. 68 is a top elevation of the sending apparatus with parts broken away.
Figure 77:
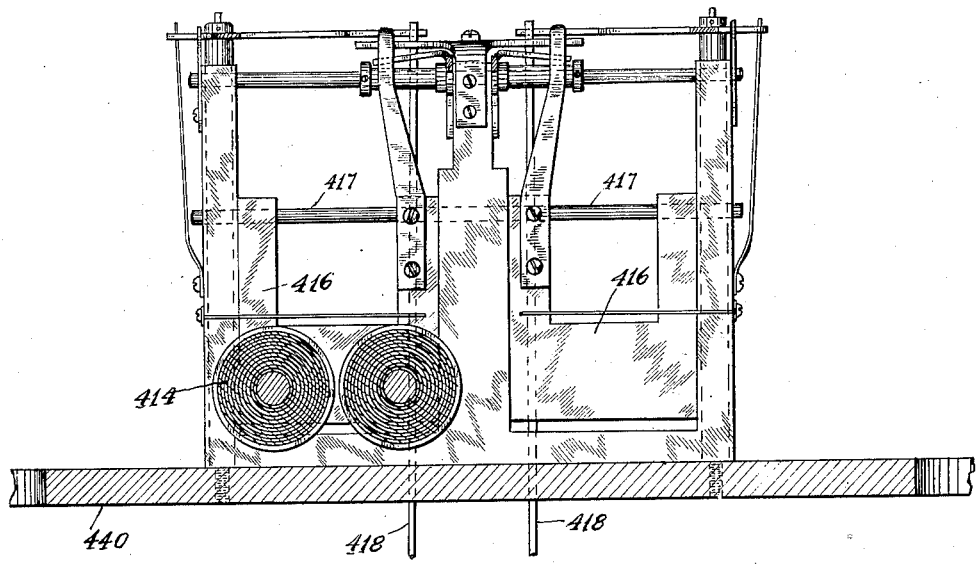
Fig. 77 is a sectional view on line L—L on Fig. 70.

About centrally located is a pivoted finger 459, and when key levers 327 are in normal position, as shown in Fig. 67 and in Fig. 66 (in full lines), the tip of said finger 459 is out of engagement with the mutilated gear 322. To limit the downward movement of the key lever, when sending, a strip 518 having the rear end slightly depending, is provided to form a stop for said key lever. A series of contact fingers 333 for each mutilated gear 322 and its associated parts are fastened on the top of the front part of the end pieces 313 and insulated therefrom by an insulating strip 334. Between the latter and the side pieces 313 is a long metal strip which serves as a contact plate and support for said contact finger 333.

The operation and function of the keyboard or transmitter is as follows:

As stated before, the long pinion 315 is continually rotating when sending messages over the line, the finger pieces 328 on which are printed the different characters (see Fig. 63) being depressed in the manner as commonly used when typewriting. By so doing, the pivoted finger turns the mutilated gear, thereby engaging the teeth on the long pinion 315, and, as said pinion is constantly rotating, the mutilated gear will now revolve until the part where the teeth are removed is reached. As all parts of the transmitter are grounded, it is apparent that as soon as the insulated contact finger 333 makes contact with the contact prongs of the metal disc 324, long and short impulses are produced, as determined by the contacts, and sent over the wire to the receiver.

Figure 3:
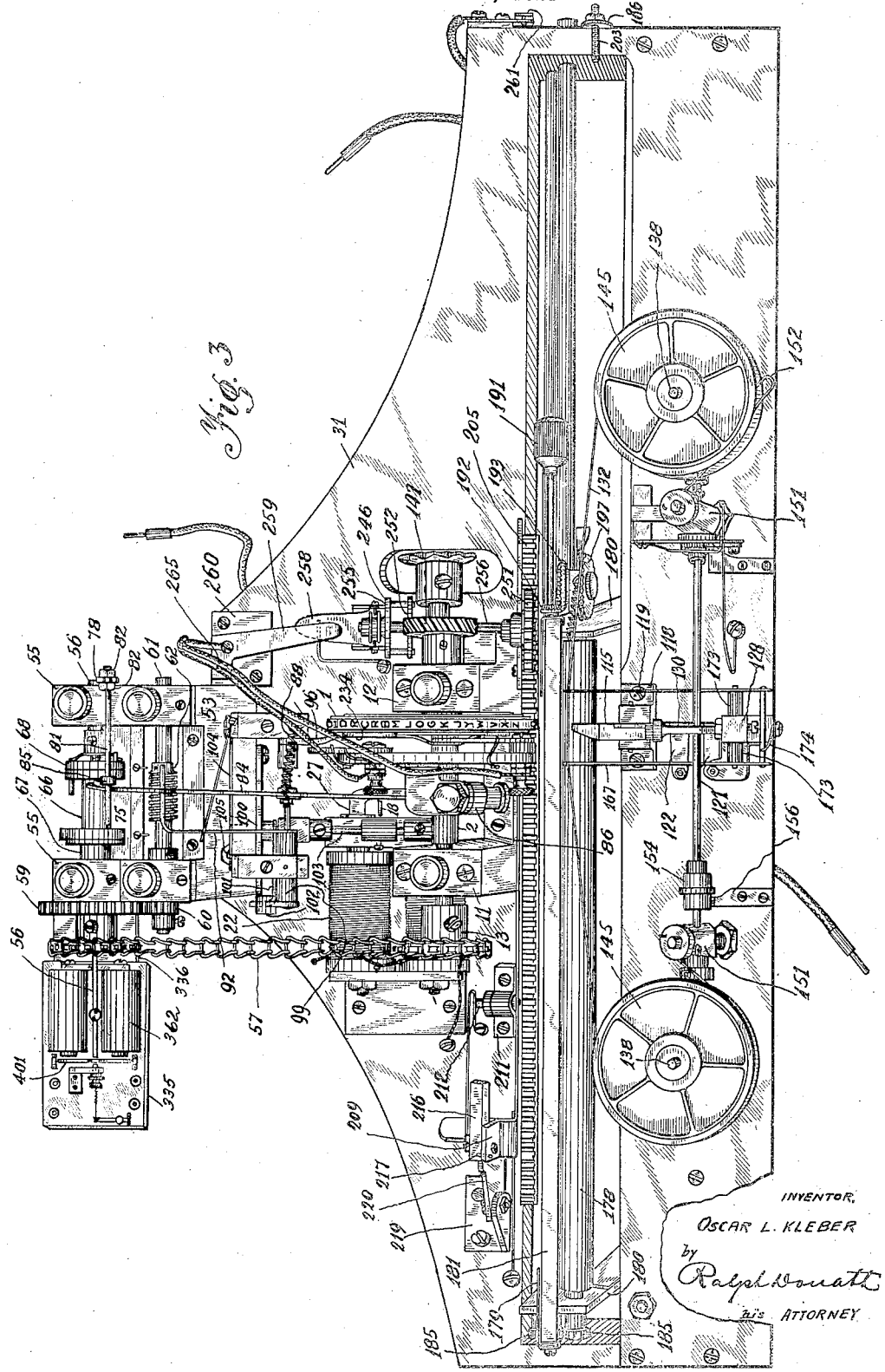
Fig. 3 is a perspective top elevation of the receiving apparatus.
Figure 4:
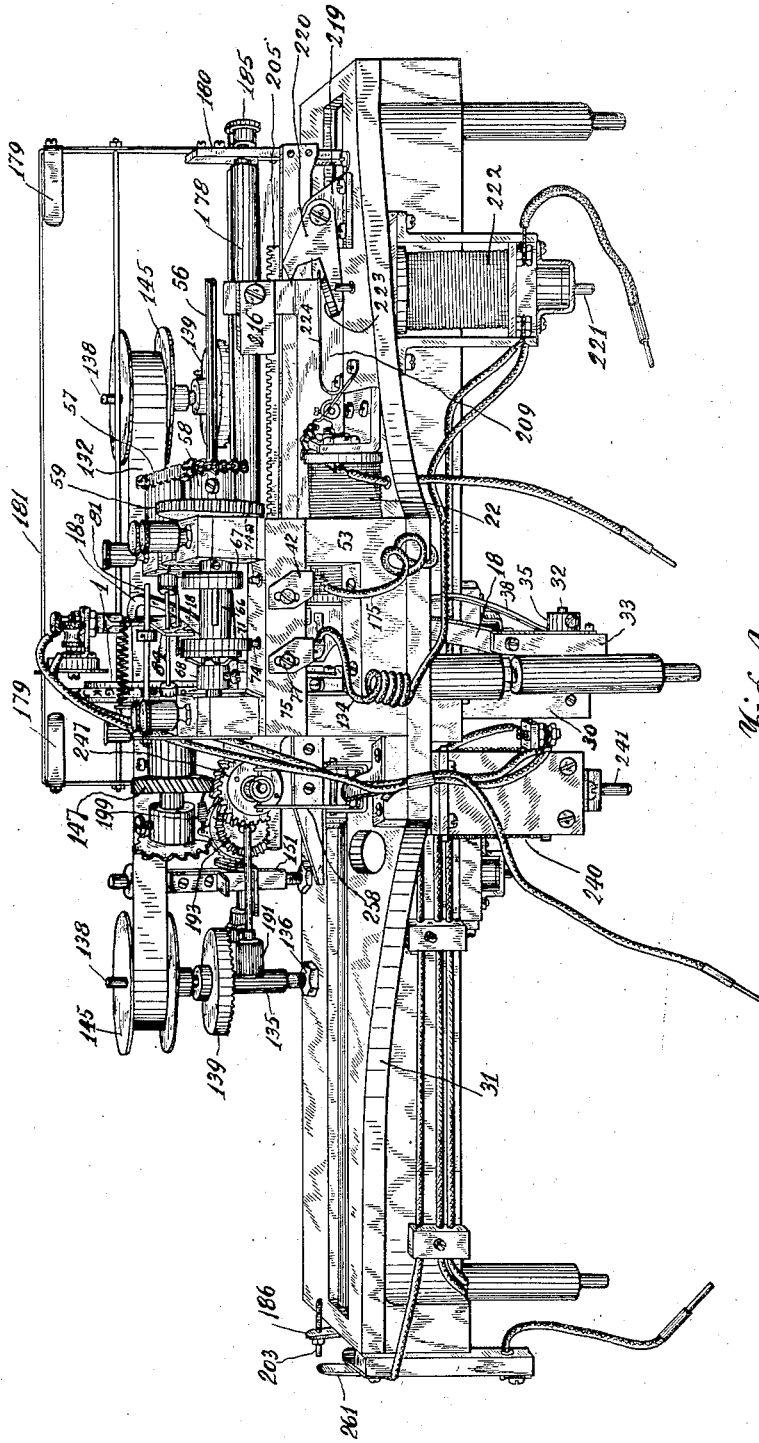
Fig. 4 is a front elevation in perspective of the receiving apparatus.

The line relay 335 (see Figs. 54 and 55) is mounted on a suitable support 336 carried by the bracket 53 (see Fig. 3).

Commutator shaft 56 extends outwardly and is suitably journaled in the standards 337 and 338 of the relay. Armature 401 of the relay is pivotally mounted in the trunnions 340, said armature being provided with tensioning means 341, such as commonly used in telegraph practice. Oppositely disposed to the end of the continuous rotating shaft 56 and mounted on support 342 is an adjusting screw 343 provided with the threaded portion 344 and the knurled head 345 and lock nut 350 for adjusting the contact points 346 and 347 in proper relation with contact points 348 and 349 mounted adjacent to the end of the armature 401 with which said contact points 348 and 349 are respectively adapted to register.

It has been found by extensive experiment that when using conventional relays on my telegraph machine the contact points have a tendency to stick, due to the sparking produced by the breaking of the local circuit upon the points of contact, either causing oxidation, fusing or welding, and thereby preventing a quick and positive break, a feature obviously obstructive to rapid and closely timed operation. Frequent cleaning and adjusting of the contact points would necessitate employing one who is skilled to properly cleanse and reset these points into correct relation and involve shut downs of the machine. To obviate the fusing or welding of the points of contact, I provide a movable, preferably a rotatable point of contact, such as shown in Figs. 54 and 55 of the drawings.

Similar contact means as are arranged on the type wheel for the return of the paper carriage (paragraphing) are also provided to stop all the machines in the circuit. A cam 351 of insulating material is placed at a predetermined position on the face of the typewheel, the front part thereof being inclined. Abutting to the straight rear end of cam 351 is a contact pin 352 which is set back in a manner similar to pin 238 for paragraphing. Attention is directed to Figs. 35 and 36, which show the different widths of said cams, the motor stop cam being set further in than the paragraph cam.

Referring now to Figs. 49 to 53, contact pawl 353 is of similar shape as contact pawl 239 and fastened in a like manner to bracket 243 by a pivot screw 354. A yielding wire spring 355 is provided to keep said contact pawl 353 in a downward position. To prevent the pawl from being thrown over, a limiting stop 356 is placed at the forward end of the contact pawl. Screw 357 hinders the said contact pawl from falling down in a manner as shown on the drawing. A wire 358 connects contact screw 359 (Fig. 49) to terminal 360 of solenoid 308 of the switch (Figs. 59 and 60).

Referring to Fig. 69, main line wire 361 is connected to one side of the coils of magnets 362 of a relay 335, the other side of the coils of these magnets being connected by wire 363 to a fixed contact jaw 268 of the starting switch 336. The yielding contact finger 270 mounted on the base of switch 267 is normally held in contact with member 268 by a tension spring 365, and the operating lever 271 of the switch is normally in the position indicated in dot and dash lines and by the letter "P" so as to be in contact with a metallic contact jaw 269. This jaw is connected by a lead 364 to a wire 366 which connects one side of the transmitter to one of the resilient jaws 293 of the switch (Figs. 59 to 62), the other jaw 293 being connected by wire 367 to yielding finger 270.

Operating lever 271 is connected by a lead to the other side of the transmitter and wire 369 connects to member 270, and the other main wire 370 is connected through an auxiliary relay 371 to wire 366.

To operate the receiver I have provided, as pointed out above, a motor which drives a generator 227, the negative pole of which is grounded by wire 229, and as shown and described above, some of the mechanisms of the receiver are mechanically driven from the motor while others are electrically energized by current supplied from the generator. The positive pole of the generator is connected by a wire 372 over the distributing points 373 and 374, to one side of the post 338. The other side of this post is connected to a condenser 375 by wire 376 and wire 377 connects the remaining side of said condenser to binding post 378 of the relay. From the same binding post, wire 379 connects to one side of the selecting magnets 22, the remaining side of said selecting magnets being grounded by wire 380.

Spliced to wire 379 is another wire 381 which connects to the angle bracket 284 of the auxiliary knife switch 382. Jaws 285 of said knife switch are connected by wire 383 to one side of the solenoid 305, the other side thereof is connected to one side of resilient jaw 294 by wire 384, the other side of said jaw 294 being connected by wire 385 to one side of battery 386. Wire 387 connects the other side of battery 386 to a cutout switch 388 which is connected by wire 389 to terminal 390 of the relay and by wire 391 to support 342, which is the local side of the relay.

The trunnions 340 of the relay armature are connected to the terminal 378 by wires 392 and 393.

The other side of solenoid 308 is connected by wire 394 to distributing point 374. Terminal 260 of solenoid 308 is connected by wire 395 to one side of jaws 292, the other side thereof being grounded.

The motor for driving the generator is connected to a suitable primary source of electrical energy by a lamp cord 396 provided with a plug 397. One wire 398 of this cord is connected to one pole of the motor, and the other wire 399 is connected to one jaw 283 of the control knife switch 276, the other jaw 283 being connected by wire 400 to plug 397.

It will be understood that the transmitter and the receiver at the same station may be operated by the same or independent motors, and that it is unnecessary to have a transmitter and receiver at each station, but if it is desired to keep a record of the messages sent out, a complete sending and receiving station is required at the sending end, as shown in Fig. 1 of the drawings.

When the message has been completed, the "Off" key of the transmitter is depressed, a series of impulses which correspond to the "off" position of the typewheel is transmitted, the typewheel stops at a predetermined position, thereby making contact between contact pin 352 on the typewheel and pawl 353, thus energizing solenoid 308 of the switch and thereby initiating the movement of the switch to open the circuit between the primary and local sources of energy by raising the plunger 310, which lifts the auxiliary knife switch blade 272 into open position, so as to break the circuit of the local battery 386. The said knife switch blade 272 raises the arm 280 of beam 279, depressing arm 288 until it contacts with the jaws 292 which establishes a circuit through solenoid 308 independent of the stop contacts on the typewheel, in order to maintain the movement of the switch while the typewheel is moving to its home position. Further movement of the arm 288 causes it to be held in depressed position by the latch lever 298 and associated parts in the manner previously described. Thus, although the contact between said contact pin 352 and pawl 353 is only momentary, yet the solenoid 308 remains energized as long as the motor generator set runs, but it will be understood that since the motor is disconnected from the primary source by the withdrawal of arm 280 from between jaws 283, the energy supplied by the generator gradually decays. It will also be seen that establishing the circuit through jaws 292 applies an electric braking effect upon the generator, tending to bring the motor-generator to rest quickly. Plunger 310 now drops to its normal position and auxiliary knife switch blade 272 returned to closed position by spring 286, after which operating lever 271 is moved by hand to its initial position indicated by letter "P" shown in Fig. 56 or in full lines in diagram Fig. 69.

This places the apparatus in its original condition for receiving messages sent over the main line.

The receiver heretofore described may be modified and varied in a number of ways to suit special conditions or to obtain greater speed and certainty of operation. For instance, I may provide two typewheels instead of one for the purpose of obtaining a greater speed when receiving messages, each of said typewheels being alternately disabled by suitable mechanism under the control of an appropriate part of the receiver.

Figure 82:
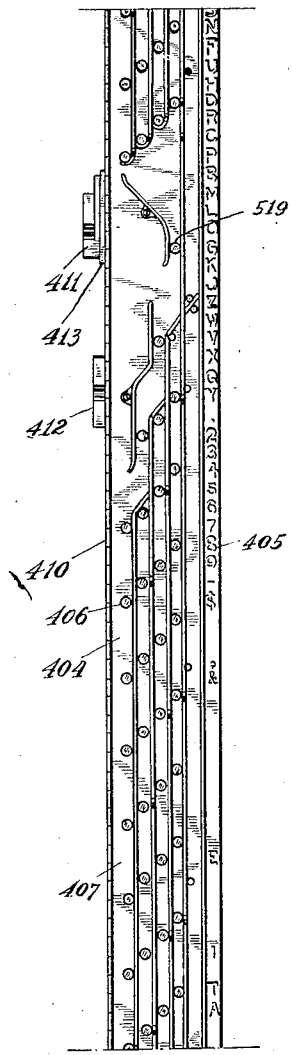
Fig. 82 is a developed view of the hub style typewheel.

It has been shown that after printing a letter there is an appreciable time loss due to the movement of the typewheel to the home position determined by stop 519 (Fig. 82). To obviate this time loss I may provide a double typewheel apparatus wherein this interval of time is usefully employed in selecting the succeeding character upon a second selecting mechanism.

I shall give no detailed description at this point of the double disc type machine since it is in many respects similar to the single disc type and in the features which result from the duplication of selecting mechanism it resembles to a great extent the double drum type which will be more fully described.

Figs. 79 to 82 show a drum typewheel 404 which has arranged on its periphery characters 405, and stops 406 are placed on the periphery of the hub part 407 in stepped order, in the same manner as on the disc typewheel.

As illustrated in Fig. 80, the two drums 404 and 409 are in frictional engagement with the common friction disc 408, which is preferably in one piece with main shaft 403. Friction means are provided against the inner face of the hubs of substantially the same construction as used in the disc style receiving machines. Check-rings 410 for preventing recoil of the typewheel when the dot or dash fingers strike the stop pins, are mounted on the outer ends of the drum hub, paragraph cam 411, motor stop cam 412 and typewheel return cam 413, and their associated parts, are of an identical construction to use on disc typewheels.

Referring to Fig. 82, the arrangement of the dot and dash fingers, the rails and bridges are shown on a developed hub, and when compared with the disc style typewheel it will be seen that the same are grouped and located in a like manner. It will be noted that the two typewheels are so spaced apart that when printing the two typewheels print two characters properly spaced on the paper. It is thus necessary to shift the paper carriage on the second impression only, at which time, however, it is moved a distance equivalent to two characters. A pair of selecting magnets 414 are fastened to a frame 415, and the armature 416 is swingingly mounted on a shaft 417. Selection of the desired character is performed in a similar manner to selection in the single disc typewheel machine, by dot finger 418, dash finger 419, and their coacting mechanism, except that the fingers are designed to act on the periphery of a drum instead of on the side of the typewheel. All parts, such as the worm 420, knife-edge lever 421, commutators 422, and brushes 423 for the same, are constructed and arranged in a similar manner as in the single disc receiving machine, certain changes and modifications being necessary because of the different relative positions of the parts. For instance, the long arm of the delayed action mechanism is made in the form of a bell crank to engage the dot finger and the knife-edge lever is bent at right angles to cooperate with the long arm lever.

Figure 78:
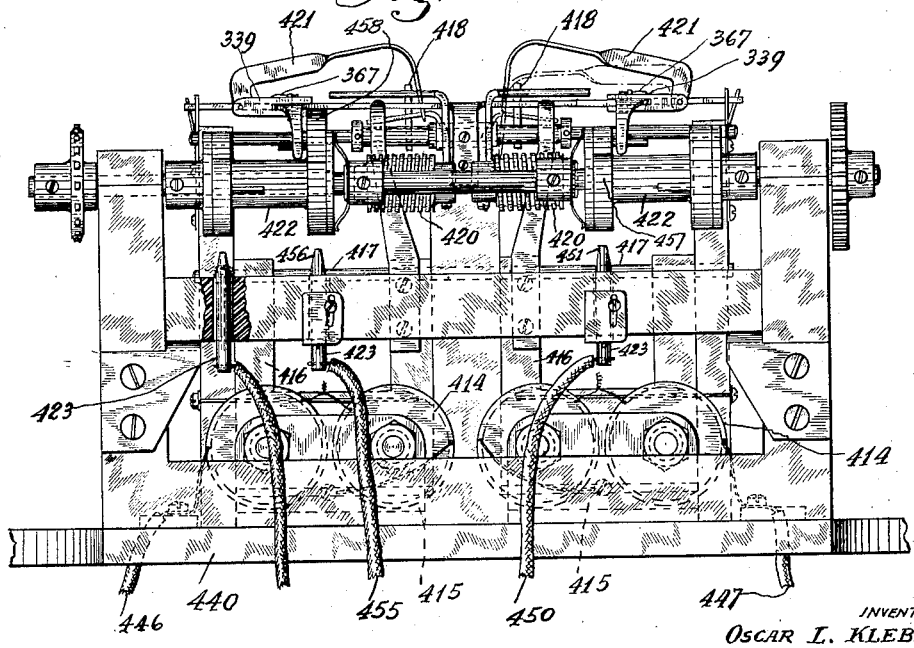
Fig. 78 is a front elevation looking in direction of arrow "M" on Fig. 70.
Figure 79:
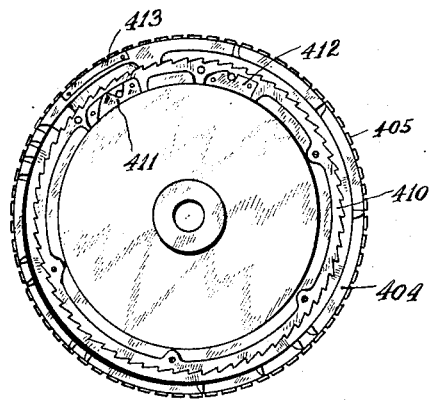
Fig. 79 is a plan view of the drum style typewheel.

In Figs. 70 and 78 the delayed action mechanism is shown as modified to permit of a limited lost motion between the knife-edge lever which cooperates with the worm and the long arm, so as to prevent cramping the knife-edge lever in the worm and to permit movement of the knife-edge lever independent of the spring for returning the long arm. The mechanism shown includes a slotted extension 339 of the knife-edge lever 421, which is adapted to embrace the long arm and works against the light spring 367 mounted upon the long arm.

As before stated, the shifting of the paper carriage should not take place after every character printed, as in the single typewheel machine, but after the completion of every second character. This may be accomplished by eliminating the shifting cam and the brush therefor on one of the commutators (see Fig. 78). It will, of course, be understood that the otherwise idle rotary switch may be used for any suitable purpose, as, for instance, the control of the ribbon shifting mechanism, independently of the spacing mechanism or other mechanisms acting subsequently to selection.

The mechanism for alternately disabling the selecting mechanism is shown in Figs. 83 and 84 and also in Fig. 70, in which 424 and 425 designate solenoids supported by a suitable frame 426, provided with the usual plungers 427 and 428, which carry at their lower ends extensions 429 and 430, the ends of which extend through the slotted portions 431 and 432 of a switchboard 433. Supported to move about a pivot and held in position by a flat spring 434, is the T-shaped contact lever 435, which engages alternately contact jaws 436 and 437 under the influence of the solenoids 424 and 425 when energized. Limiting pins 438 and 439 are provided to prevent the contact lever 435 from being thrown further than desired.

Above the main base 440 are a pair of printing hammers 460 and 461 supported on a base bracket 441 and constructed in the same manner as previously described for single disc receivers, except that the abutment portions 442, 443, 444 and 445 are right and left handed for obvious reasons.

Figure 85:
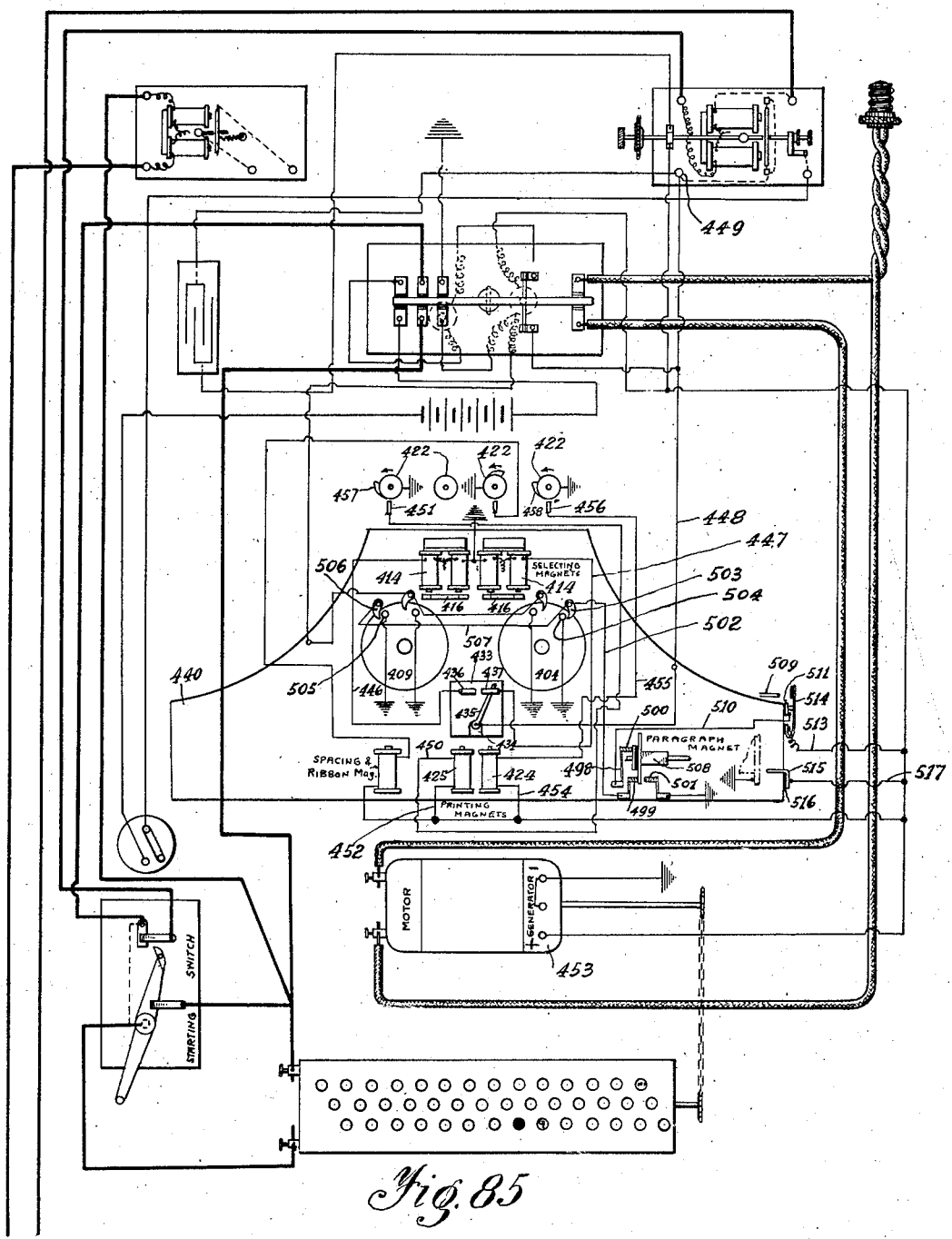
Fig. 85 is a circuit diagram using a double typewheel.

By reference to Fig. 85 of the drawings, it will be seen that contact jaw 436 connects by wire 446 to one end of a pair of selecting magnets 414 and jaw 437 by wire 447 to one end of another pair of magnets 414. An additional wire 448 connects from the spring 434 to terminal 449 of the relay.

One side of printing solenoid 425 is connected by wire 450 to brush 451, and the other side of the solenoid by lead 452 to the positive side of generator 453.

Lead 454 of the other printing solenoid 424 is connected to the positive side of generator 453 and the other side of said solenoid 424 is connected by wire 455 to brush 456. Printing commutator cams 457 and 458 are grounded.

Solenoids 424 and 425 are energized alternately by such brushes and commutators as are cut in on their respective circuits. Plunger 427 of solenoid 425 is, when energized, (similar to Fig. 43) quickly raised, thereby engaging abutment knob and swinging the face of the hammer head towards the paper through an inking ribbon and against the type of the typewheel. At the same time, the end of lever 429 strikes the underside of arm 462 of the T-shaped contact lever 435, thereby throwing the said lever into engagement with contact jaw 437 of the switch. The same operation takes place when solenoid 424 is energized and contact lever 435 is brought into contact with jaw 436. It will thus be seen that immediately upon the printing operation, the selecting mechanism with which the printing mechanism has cooperated, is disabled and the other selecting mechanism put into a condition to be operated, and that while the selecting operation on the second selecting mechanism is going on the functions subsequent to printing in connection with the first selector, such as returning home, spacing, etc., are being performed independent of the selecting mechanism which, at that time, is disabled. This results not only in a saving of time in selection, but permits the subsequently operating mechanism to be run at a more moderate speed and therefore with greater certainty.

The paragraphing cams on the typewheels are of the same design as those used on the single disc receiver, and it is preferable to use paragraphing and stopping mechanisms in connection with each typewheel.

Referring now to Figs. 72 to 76, there is shown a modification of the paper carriage return means, comprising a shaft 463 which is supported in standards 464 and 465, said shaft being held from longitudinal movement on the inner side of standard 464 by a collar 466 and on the outer side of said standard by a ch a gear 467 over which a chain is carried to chain gear 468, the latter being keyed or fastened on one end of the typewheel shaft 463.

Solenoid 508 is slidably mounted on shaft 463, and the core 469 of said solenoid has a centrally disposed aperture 470 which acts as a bearing. One end of the core 469 has fastened thereto an end disc or armature 471 of soft iron, on which are a pair of diametrically disposed laterally projected pins 472, the ends thereof being tapered; said pins are extended into corresponding apertures 473 of a flanged collar 474 of soft iron, said collar being held rigid on the shaft by set screw 475.

The other end of the core 469 is of smaller diameter and is threaded for the reception of the end disc 478 of insulating material. Between the latter and the wire of solenoid 508 is placed a circular copper contact disc 477, on which is soldered one end of the wire of solenoid 508. An additional copper contact disc 478 preferably of the same diameter as said insulating disc 478, is provided and the other end of the wire of solenoid 508 is soldered to this disc. Nut 479 is provided to hold the discs firmly against the wire. Collar 480 held to shaft 463 by a set screw 481 is placed against the rear end of said hollow core 469, thus limiting the longitudinal movement of said solenoid at this end. The wire of the solenoid is protected by a cylindrical covering 482.

Flanged collar 474 is counter-bored for the reception of a yielding coil spring 483. A circular disc 485, which is secured on the end of a bearing nipple 484, is in abutment with the hub end of flanged collar 474, and a pair of pins 486 are fastened in disc 485 in the same manner and on the same diameter as pins 472 in armature 471. Drum 487 is revolubly mounted on nipple 484 and is provided with a hook 488 on which is fastened the end of a cord 489, the latter being guided over a grooved pulley 490 and fastened to the side bar 491 of the paper carriage 492. Another cord 493 is fastened to the side bar 476 and carried over guide pulleys and to a drum in which is contained a clock spring. This latter device is used for properly tensioning the paper carriage 492 and is of the same construction as shown in Figs. 7 and 8 of the drawings.

Abutting the side of the outer flange of drum 487 is a circular disc 455 which is held firmly in frictional contact by means of a pronged tension spring 456 and properly adjustable by a nut 494.

The longitudinal movement of the nipple bearing 484 is checked by a spacing collar 495. Fixed to an insulating block 496 are individual contact strips 497 and 498 respectively, which are provided with brushes 499 and 500 respectively, both brushes being in continuous contact with the copper discs 447 and 478. An additional grounded brush 501 is fastened on the underside of base 440 and when in normal position is out of contact with contact disc 477. Wire 502 connects contact brush 499 with contact pawl 503 and wire 507 cross connects pawl 506. Contact pins 504 and 505 on typewheel are grounded.

When depressing the paragraph key on the sender, one of the typewheels is brought to a momentary stop at a predetermined position, so that one of the contact pawls 503 or 506 comes into momentary contact with pins 504 or 505, depending on which side of the selecting mechanism is operating, thereby energizing solenoid 508. As the shaft 463 on which the solenoid 508 is slidably mounted is continuously revolving, the flanged collar 474 through which the tapered pins 472 penetrate, forces the solenoid 508 to also rotate with the shaft, and the moment the solenoid is energized, it is moved toward the face of flanged collar 474, thereby engaging pins 486 of said collar 485. Drum 487 now rotating with the shaft 463 winds cord 489 about it, and, as the other end of cord 489 is fastened to the paper carriage (see Fig. 76), the latter is returned to its starting position.

It will be remembered that solenoid 508 is only momentarily energized, which would not be sufficient to fully return the paper carriage to its starting position. For this reason I have provided contact brush 501, which comes into contact with disc 477, thereby continuing the circuit while said solenoid is moved toward the flanged collar 474 and until the pin 509 opens the circuit.

On the end of base 440 I provide a normally closed switch 511, as shown in full lines in Fig. 76 of the drawings. Wire 510 connects pin contact 512 to brush-holder 498 and another wire 513 is connected to spring contact 514 and to the positive line of the generator. Directly underneath switch 511 is a yielding pin contact 515 insulated from the base by plate 516 and wire 517 is connected to the positive line of the generator. The function of the aforesaid switch 511 and pin contact 512 is identically the same as the corresponding parts heretofore described in connection with single typewheel receivers (shown in Fig. 40).

No detailed description of the stopping mechanism is necessary, as it is similar to that used in the single typewheel machine and will readily be understood from the drawings.

I have not considered it necessary to give any detailed description of the tape writer or ticker, as it will be understood that it may be operated as a single or double disc or drum device, the paper carriage and paragraphing mechanism being eliminated and suitable means, such as are shown in the prior art, for advancing the tape substituted.

It is obvious that numerous changes may be made in the details set forth without departure from the essentials of the invention as defined in the claims, and that certain features of the invention may be employed without its adoption in entirety.

I claim as my invention:

1. In a device of the kind described, a plurality of mechanisms; a source of energy, a selecting mechanism operating under the control of received impulses; a circuit breaker for disconnecting the source of energy operated under the control of said selecting mechanism to disconnect the source of energy and operated under the control of received impulses independently of the selecting mechanism to connect the source of energy.

2. In a device of the kind described, a plurality of mechanisms, a primary source of electrical energy, a local source of energy, a switch interposed between said sources, a selecting mechanism operated under the control of received impulses, means for opening said switch under the control of said selecting mechanism, and means for closing said switch operated under the control of received impulses independently of the selecting mechanism.

3. In a device of the kind described, a plurality of mechanisms, a local source of energy adapted to serve said mechanisms, a primary source of energy, connecting means interposed between said sources, a selecting mechanism operated from the local source of energy under the control of received impulses, and means for closing said connecting means operated under the control of received impulses independently of the selecting mechanism.

4. In a device of the kind described, a plurality of electromagnetic mechanisms, a source of energy, a switch adapted in one position to connect said source with said mechanisms, means tending to hold said switch in said position, and means operated in response to a predetermined signal to open said switch against the action of said holding means to thereby disconnect the source of energy.

5. In a device of the kind described, a plurality of electromagnetic mechanisms, a source of energy, a switch adapted in one position to connect said source with said mechanisms, means tending to hold said switch in said position, and means operated in response to a predetermined signal to open said switch against the action of said holding means to thereby disconnect the source of energy and to hold said switch in the open position.

6. In a device of the kind described, a plurality of electromagnetic mechanisms, a source of energy, a switch adapted in one position to connect said source with said mechanisms, means tending to hold said switch in said position, means operated in response to a predetermined signal to open said switch against the action of said holding means to thereby disconnect the source of energy, and means adapted to hold said switch in the open position after the source of energy has been disconnected.

7. In a device of the kind described, a source of energy, a plurality of mechanisms, a switch adapted to connect said source with said mechanisms, electromagnetic means for opening said switch, means operated in response to a predetermined signal to initiate the action of said electromagnetic means, and means for maintaining said action to continue the opening movement of said switch.

8. In a device of the kind described, a source of energy, a plurality of mechanisms, a switch adapted to connect said source with said mechanisms, electromagnetic means for opening said switch, means operated in response to a predetermined signal to initiate the action of said electromagnetic means, means for maintaining said action to continue the opening movement of said switch, and mechanical means for holding said switch in the open position.

9. In a device of the kind described, in combination, a source of energy, a plurality of mechanisms, a switch adapted to connect said source with said mechanisms, means operated in response to a predetermined signal to initiate the opening of said switch, means for maintaining said opening action, and means independent of said initiating and maintaining means to hold said switch in the open position.

10. In a device of the kind described, a primary source of electrical energy, a local source of energy, a switch interposed between said sources, a selecting mechanism operated from the local source of energy under the control of received impulses, means for opening said switch operated from the local source of energy under the control of said selecting mechanism, a second local source of energy, and means for closing said switch operated from said second source of energy under the control of received impulses.

11. In a device of the kind described, a primary source of electrical energy, a local source of electrical energy, a switch interposed between said sources, a selecting mechanism operated from the local source of energy under the control of received impulses, means for opening said switch operated from the local source of energy under the control of said selecting mechanism, a second local source of energy, and means for closing said switch operated from said second source of energy under the control of received impulses independently of the selecting mechanism.

12. In a device of the kind described, a primary source of electrical energy, a local source of energy connected to said primary source, a switch interposed between said sources, a second local source of energy independent of the primary source, means for opening said switch under the control of received impulses operated from the first local source, and means for closing said switch operated from said second source under the influence of received impulses.

13. In a device of the kind described, a primary source of electrical energy, a first local source of energy connected thereto, a switch interposed between said sources, a selecting mechanism operated by said first local source under the control of received impulses, a second local source independent of said primary source of energy, means for opening said switch operated from the first local source of energy under the control of said selecting mechanism, and means for closing said switch operated from said second source of energy.

14. In a device of the kind described, a primary source of electrical energy, a first local source of energy connected thereto, a switch interposed between said sources, a selecting mechanism operated from said first local source under the control of received impulses, a second local source independent of said primary source of energy, means for opening said switch operated from the first local source of energy under the control of said selecting mechanism, and means for closing said switch operated from said second source of energy under the control of received impulses and independently of said selecting mechanism.

15. In a device of the kind described, a primary source of electrical energy, a first local source of energy connected thereto, a switch interposed between said sources and biased to move in the closing direction, a selecting mechanism operated from the first local source of energy under the control of received impulses, means for opening said switch against the biasing means operated from the first local source of energy under the control of said selecting mechanism, means for holding the switch in the open position, and means for releasing said holding means operated from said second local source of energy under the control of received impulses and independently of said selecting mechanism.

16. In a device of the kind described, a primary source of electrical energy, a local source of electrical energy, a switch for connecting said sources biased to move in the closing direction, a selecting means operated from the local source of energy under the control of received impulses, and means for holding said switch in the open position adapted to be disabled under the control of received impulses.

17. In a device of the kind described, a primary source of electrical energy, a local source of electrical energy, a switch for connecting said sources and biased to move in the closing direction, a selecting mechanism operated from the local source of energy under the control of received impulses, means for holding said switch in the open position adapted to be disabled under the control of received impulses to permit the closing of said switch and means adapted to be operated under the control of received impulses for opening said switch.

18. In a device of the kind described, a primary source of energy, a local source of energy operated therefrom, the energy supplied by said local source being of a nature to gradually decay when said local source is disconnected from said primary source, a switch for connecting the primary and local sources, means operated in response to a predetermined signal for initiating the opening of said switch, means for maintaining the opening movement of said switch during the period of energy decay of the local source, and means for holding the switch in the open position.

19. In a device of the kind described, a primary source of energy, a local source of energy operated therefrom, the energy supplied by said local source being of a nature to gradually decay when said local source is disconnected from said primary source, a switch for connecting the primary and local sources, electromagnetic means operated in response to a predetermined signal for initiating the opening of said switch, means for maintaining the opening movement of said switch during the period of energy decay of the local source, and means for holding the switch in the open position.

20. In a device of the kind described, a primary source of energy, a local source of energy operated therefrom, the energy supplied by said local source being of a nature to gradually decay when said local source is disconnected from said primary source, a switch for connecting the primary and local sources, means operated in response to a predetermined signal operated from the local source for initiating the opening of said switch, means for maintaining the opening movement of said switch during the period of energy decay of the local source, and means for holding the switch in the open position.

21. In a device of the kind described, a primary source of energy, a local source of energy operated therefrom, the energy supplied by said local source being of a nature to gradually decay when said local source is disconnected from said primary source, a switch for connecting the primary and local sources, electromagnetic means operated in response to a predetermined signal operated from the local source for initiating the opening of said switch, electromagnetic means for maintaining the opening movement of said switch during the period of energy decay of the local source, and means for holding the switch in the open position.

22. In a device of the kind described, a primary source of energy, a local source of energy operated therefrom, the energy supplied by said local source being of a nature to gradually decay when said local source is disconnected from said primary source, a switch for connecting the primary and local sources, electromagnetic means operated in response to a predetermined signal operated from the local source for initiating the opening of said switch, electromagnetic means for maintaining the opening movement of said switch during the period of energy decay of the local source operated from the local source, and means independent of the local source for holding the switch in the open position.

23. In a device of the kind described, a primary source of energy, a local source of energy operated therefrom, the energy supplied by said local source being of a nature to gradually decay when said local source is disconnected from said primary source, a switch for connecting the primary and local sources, means operated in response to a predetermined signal for initiating the opening of said switch, means for maintaining the opening movement of said switch during the period of energy decay of the local source, and mechanical means for holding the switch in the open position.

24. In a device of the kind described, a primary source of energy, a local source of energy operated therefrom, the energy supplied by said local source being of a nature to gradually decay when said local source is disconnected from said primary source, a switch for connecting the primary and local sources, electromagnetic means operated in response to a predetermined signal operated from the local source for initiating the opening of said switch, electromagnetic means for maintaining the opening movement of said switch during the period of energy decay of the local source operated from the local source, and mechanical means for holding the switch in the open position.

25. In a device of the kind described, in combination, a primary source of energy, a local source of energy operated therefrom, the energy supplied by said local source being of a nature to gradually decay when said local source is disconnected from said primary source, a switch for connecting the primary and local sources, means operated in response to a predetermined signal to initiate the opening of said switch, means for maintaining said opening action of said switch during the period of energy decay of the local source, and means independent of said initiating and maintaining means to hold said switch in the open position.

26. In a device of the kind described, a primary source of energy, a local source of energy operated therefrom, the energy supplied by said local source being of a nature to gradually decay when said local source is disconnected from said primary source, a switch for connecting the primary and local sources, a solenoid adapted to open said switch and operated from said local source of energy, means operated in response to a predetermined signal for momentarily closing the circuit to said solenoid to initiate the opening of said switch, means operated by the initiating movement of said solenoid adapted to hold the circuit thereof closed during a portion of the period of energy decay of said local source, and means for holding the switch in open position.

27. In a device of the kind described, a primary source of energy, a local source of energy operated therefrom, the energy supplied by said local source being of a nature to gradually decay when said local source is disconnected from said primary source, a switch for connecting the primary and local sources of energy, means tending to hold said switch in closed position, a solenoid adapted to open said switch against the action of said means and adapted to be operated from said local source of energy, means operated in response to a predetermined signal for momentarily closing the circuit to said solenoid to initiate the opening movement of said switch, means operated by the initial movement of said switch for holding the circuit of said solenoid closed during a portion of the period of energy decay of the local source thereby to complete the opening movement of said switch, and mechanical means for holding said switch in the open position.

28. In a device of the kind described, a primary source of electrical energy, a local source of energy including a motor-generator, type-selecting mechanism, switching means to disconnect the primary and local sources, means for initiating the switching operation controlled by the type-selecting mechanism, and means for continuing the switching operation operated from said generator and acting as a brake upon the motor.

29. In a device of the kind described, a primary source of electrical energy, a local source of energy including a motor-generator, type-selecting mechanism, switching means to disconnect the primary and local sources, means including a solenoid for exerting a braking effect upon the generator when said primary and local sources are disconnected, means operated from said solenoid to open said switching means, means controlled by the type-selecting mechanism for initiating the disconnecting operation of said switching means, and means for closing the circuit to said solenoid for continuing the said switching operation and to exert a braking effect upon said generator.

30. In a device of the kind described, a primary source of electrical energy, a secondary source of energy, a switch adapted to connect the primary and local sources and biased to move in the closing direction, means for holding the switch in the open position, a line relay, and means operated under the control of the line relay for releasing the holding means.

31. In a device of the kind described, a primary source of electrical energy, a secondary source of energy, a switch adapted to connect the primary and local sources and biased to move in the closing direction, means for holding the switch in the open position, a second local source of energy, a line relay, and means operated from the second local source under the control of the line relay for releasing the holding means.

32. In a device of the kind described, a primary source of electrical energy, a secondary source of energy, a switch adapted to connect the primary and local sources and biased to move in the closing direction, means for holding the switch in the open position, a second local source of energy, a line relay, means operated from the second local source under the control of the line relay for releasing the holding means, and means operated by the switch for disconnecting the second local source of energy from the releasing means.

33. In a device of the kind described, a primary source of electrical energy, a secondary source of energy, a switch adapted to connect the primary and local sources and biased to move in the closing direction, means for holding the switch in the open position, a second local source of energy, a line relay, means operated from the second local source under the control of the line relay for releasing the holding means, and means operated by the switch for taking the releasing means out of the control of the line relay during the time that the primary and local sources are connected.

34. In a device of the kind described, a primary source of electrical energy, a secondary source of energy, a switch adapted to connect the primary and local sources and biased to move in the closing direction, a latch for holding the switch in the open position, a second local source of energy, an electromagnet for operating said latch to release said switch, a line relay for energizing said electromagnet from said second local source, and means operated by the switch upon its release for disconnecting said electromagnet from said second local source.

35. In a device of the kind described, a primary source of electrical energy, a local source of electrical energy derived therefrom, a translating device, a plurality of devices mechanically operated from the translating device, and a plurality of devices electrically operated from the local source of electrical energy.

36. In a device of the kind described, a primary source of electrical energy, a translating device, a local source of electrical energy operated therefrom, a plurality of devices mechanically operated from the translating device, a plurality of devices electrically operated from the local source of electrical energy, and means for disconnecting the primary source from the translating device and for braking the mechanically driven devices.

37. In a device of the kind described, a primary source of electrical energy, a translating device, a local source of electrical energy operated therefrom, a plurality of devices mechanically operated from the translating device including a typewheel, a plurality of devices electrically operated from the local source including the selecting fingers, and means operated under the control of the typewheel and selecting fingers for disconnecting the primary source from the translating device.

38. In a device of the kind described, a primary source of electrical energy, a translating device, a local source of electrical energy operated therefrom, a plurality of devices mechanically operated from the translating device including a typewheel, a plurality of devices electrically operated from the local source including the selecting fingers, and means operated from the local source and under the control of the typewheel and selecting fingers for disconnecting the primary source from the translating device.

39. In a device of the kind described, a primary source of electrical energy, a translating device, a local source of electrical energy operated therefrom, a plurality of devices mechanically operated from the translating device including a typewheel, a plurality of devices electrically operated from the local source including the selecting fingers, and means operated under the control of the typewheel and selecting fingers for disconnecting the primary source from the translating device and for braking the mechanically driven devices.

40. In a device of the kind described, a primary source of electrical energy, a translating device, a local source of electrical energy operated from said translating device, a switch for connecting said primary source to said translating device, a plurality of devices mechanically operated from said translating device, a plurality of devices electrically operated from said local source of electrical energy, a line relay for controlling the operation of said electrically operated devices, and means under the control of said line relay adapted to operate said switch.

41. In a device of the kind described, a primary source of electrical energy, a translating device, a local source of electrical energy operated from said translating device, a switch for connecting said primary source to said translating device, a plurality of devices mechanically operated from said translating device, a plurality of devices electrically operated from said local source of electrical energy, a line relay for controlling the operation of said electrically operated devices, means under the control of the line relay for initiating the closing of said switch, and separate means for completing the closing of said switch.

42. In a device of the kind described, a primary source of electrical energy, a motor generator, a switch for connecting said motor generator to said primary source, a plurality of devices including a rotary type-bearing member adapted to be mechanically operated from said motor, a plurality of electrical devices including a selecting mechanism electrically operated from the generator, a line relay for controlling the selecting operation of said selecting mechanism in response to received impulses, and means under the control of said line relay for initiating the closing of said switch.

43. In a device of the kind described, a primary source of electrical energy, a motor generator, a switch for connecting said motor to said primary source, a plurality of devices including a type-bearing member and a carriage-returning mechanism mechanically operated from said motor, a plurality of electrical devices operated from said generator, for selectively operating said type-bearing member and said carriage-returning mechanism, a line relay adapted to control the selective operation of said electrical devices in accordance with received impulses, and means under the control of said line relay for operating said switch.

44. In a device of the kind described, a primary source of electrical energy, a motor generator operated therefrom, a printing mechanism comprising an electrically operated selecting portion operated from said generator and an electrically operated completing portion adapted to cooperate therewith, a line relay adapted to control the operation of said selecting portion in response to received impulses, a rotary switch adapted to be mechanically operated from said motor to connect said completing portion to said generator thereby to operate said completing portion.

45. In a device of the kind described, a primary source of electrical energy, a motor generator connected thereto, a printing mechanism comprising an electrically operated selecting portion and a plurality of electrically operated completing portions adapted to cooperate therewith, a line relay for controlling said selecting portion in response to received impulses, a rotary switch adapted to sequentially connect said completing portions to said generator, means connected to said motor tending constantly to rotate said switch, and a delayed action mechanism for preventing the operation of said rotary switch in advance of the completion of the operation of the selecting portion of said printing mechanism.

46. In a device of the kind described, in combination, a primary source of energy, a translating device, a local source of energy operated from the translating device, selecting mechanism electrically operated from the local source, a rotating switch mechanically operated from the translating device, and means for arresting and releasing said rotating switch mechanically operated from the translating device under the control of the selecting mechanism.

47. In a device of the kind described, in combination, a primary source of energy, a translating device, a local source of energy operated from the translating device, selecting mechanism electrically operated from the local source, a rotating switch mechanically operated from the translating device, a delayed action mechanism mechanically operated from the translating device under the control of the selecting mechanism to prevent the rotation of the switch until the completion of the selecting operation by said selecting mechanism.

48. In a device of the kind described, in combination, a primary source of energy, a translating device, a local source of energy operated from the translating device, a printing mechanism, comprising a selecting portion adapted to be electrically operated from the local source and a subsequently acting completing portion, and means mechanically driven by the translating device under the control of the selecting mechanism for preventing the operation of the subsequently operating mechanism until after the completion of the selecting operation and for connecting said subsequently operating completing portion to the local source.

49. In a device of the kind described, a printing mechanism comprising a selecting portion adapted to be positioned in response to received impulses, and a completing portion adapted to cooperate therewith, a local source of energy, a rotary switch adapted to connect said completing portion to said source of energy, means tending constantly to rotate said switch, a pair of stops mounted on said switch in angular spaced relation, a delayed action mechanism engaging one of said stops to hold said switch in open position and adapted to disengage said stop to release said switch after the completion of the selecting operation, and means for engaging said second stop to limit the angular movement of said switch.

50. In a device of the kind described, a printing mechanism, comprising a selecting portion adapted to be positioned in response to received impulses, and a completing portion adapted to cooperate therewith, a local source of energy, a rotary switch adapted to connect said completing portion to said source of energy, means tending constantly to rotate said switch, a pair of stops mounted on said switch in angular spaced relation, and a delayed action mechanism engaging one of said stops to hold said switch in open position and adapted to disengage said stop to release said switch after the completion of the selecting operation, said delayed action mechanism being thereupon adapted to engage said second stop thereby to limit the angular movement of said switch.

51. In a device of the kind described, a printing mechanism comprising a selecting portion adapted to be positioned in response to received impulses and a plurality of completing portions adapted sequentially to co-operate therewith, a source of energy, a rotary switch adapted to connect said completing portions sequentially to said source of energy throughout a predetermined angular movement of said switch, a pair of stops mounted on said rotary switch in angular spaced relation corresponding substantially to said predetermined angular movement of said switch, means tending constantly to rotate said switch, means engaging one of said stops to hold said switch in open position, a delayed action mechanism adapted to cause the said means to disengage said stop after the completion of the selection portion thereby to release said switch, and means adapted to engage the other of said stops to limit the angular rotation of said switch.

52. In a device of the kind described, a printing mechanism comprising a selecting portion adapted to be positioned in response to received impulses and a plurality of completing portions adapted sequentially to cooperate therewith, a source of energy, a rotary switch adapted to connect said completing portions sequentially to said source of energy throughout a predetermined angular movement of said switch, a pair of stops mounted on said rotary switch in angular spaced relation corresponding substantially to said predetermined angular movement of said switch, means tending constantly to rotate said switch, means engaging one of said stops to hold said switch in open position, biasing means tending to maintain said holding means in engagement with said stop, a delayed action mechanism adapted to move said holding means out of engagement with said stop after the completion of the selecting operation, thereby to release said switch, means for moving said holding means into engagement with said second stop thereby to limit the angular movement of said switch, said biasing means being adapted thereupon to move said holding means out of engagement with said second stop and into engagement with said first stop.

53. In a device of the kind described, means for returning the paper carriage, comprising a paper carriage, a motor controlling means therefor, a type wheel carrying means for momentarily closing the circuit energizing the motor-controlling means, means adapted to hold said circuit closed, and means operated by the carriage for opening the circuit to the motor-controlling means to deenergize the same.

54. In a device of the kind described, a type wheel, selecting means therefor operated in response to received impulses, a motor, controlling means therefor, means mounted upon said type wheel to momentarily close the circuit to said controlling means upon selection by a predetermined signal, means for returning said type wheel to its initial position upon completion of said selection, means for maintaining the energizing circuit of the motor-controlling means upon the return of the type wheel independently of said type wheel, and means operated by the movement of the carriage to deenergize the motor-controlling means.

55. In a device of the kind described, a selecting mechanism, a rotating worm, a movable member cooperating therewith and adapted to be brought into and out of operative relation therewith by the selecting mechanism, and a switch controlling member movable under the influence of the movable member and biased to move in a direction opposite to that determined by the direction of the worm and a lost motion mechanism permitting movement of the movable member with respect to the switch controlling member to an extent determined by the length of the impulses received.

56. In a device of the kind described, a rotating type wheel, a movable finger cooperating therewith to arrest the type wheel in a position determined by received signals, a subsequently acting mechanism, a delayed action mechanism operating to interpose a time interval between the completion of the type wheel positioning operation and the operation of the subsequently operating mechanism and to trip the finger to permit the type wheel to return to its initial position, and means carried by the type wheel, to release the delayed action mechanism to permit it to be returned to its initial position and to thereby release the finger to enable it to arrest the type wheel in its initial position.

57. In a device of the kind described, a rotating type wheel, an associated mechanism, a stationary contact, a contact carried by the type wheel cooperating therewith, said contacts being adapted to make electrical contact when the type wheel is brought to a momentary rest at a predetermined position, but inoperative to make electrical contact during rotation of said type wheel.

58. In a device of the kind described, a rotating selecting mechanism, an associated mechanism, means for electromagnetically operating said associated mechanism and means carried by the rotating selecting mechanism for energizing said associated mechanism when the rotating mechanism is brought to a momentary rest at a predetermined position, but inoperative to energize said associated mechanism during movement of said rotating mechanism.

59. In a device of the kind described, a line, a plurality of stations connected thereto, each station comprising a line relay, a transmitter in series therewith, a local source of energy and selecting mechanism operated by said local source and under the control of the line relay, means at each station for disabling the local source of energy and for short-circuiting the transmitter, and means at each station for momentarily operating the line relay at a distant station to put the selecting mechanism at said distant station in operative condition.

60. In a device of the kind described, a line, a plurality of stations connected thereto, each station comprising a line relay, a transmitter in series therewith, a local source of energy and selecting mechanism operated by said local source and under the control of the line relay, means at each station for disabling the local source of energy and for short-circuiting the transmitter, and means at each station for momentarily operating the line relay at a distant station to put the selecting mechanism at said distant station in operative condition, said means acting independently of the local source of energy from which the selecting mechanism at that station is operated.

61. In a device of the kind described, in combination, a line, a plurality of stations connected thereto, each station comprising a line relay, a transmitter in series therewith, a local source of energy and selecting mechanism operated by said local source under control of the line relay, means at each station operated from the local source of energy for disabling said local source and for short-circuiting the transmitter, and means at each station for momentarily operating a line relay at a distant station said means acting independently of the local source of energy from which the selecting mechanism at that station is operated.

62. In a device of the kind described, a type-bearing member, selecting means adapted to position said type-bearing member in response to received impulses, a plurality of completing mechanisms adapted to cooperate with said type-bearing member, a source of energy, a rotary switch adapted to connect said completing mechanisms sequentially to said source of energy during a predetermined angular movement of said switch, a pair of stops mounted upon said rotary switch in angular spaced relation corresponding substantially to said predetermined angular movement of said switch, means adapted to engage the first of said stops to hold said switch in open position, means for moving said holding means out of engagement with said first stop and into engagement with said second stop to permit said switch to partake of said predetermined angular movement, a delayed action mechanism adapted to permit said moving means to become operative after the completion of the selecting operation, means operative upon the substantial return to normal of said type-bearing member for disabling said moving means, and means for moving said holding means into engagement with said first stop after the disabling of said moving means.

63. In a device of the kind described, a primary source of electrical energy, a translating device, a local source of electrical energy derived therefrom, a plurality of devices mechanically operated from the translating device and including one element of a selecting mechanism, a plurality of devices electrically operated from the local source and including another element of the selecting mechanism, a line relay adapted to control the operation of said devices in response to received impulses, said relay having one of its contacts rotated with respect to the other from said translating device.

64. In a device of the kind described, two selecting mechanisms adapted to alternately operate in response to received impulses, two subsequently operating mechanisms, one associated with each of said selecting mechanisms and adapted to operate subsequently thereto, two switches each adapted to control the operation of said subsequently operating mechanisms, two delayed action mechanisms each operating under the influence of a selecting mechanism and operating to prevent the operation of said subsequently operating mechanisms until the selecting operation of the selecting mechanism with which said delayed action mechanism is associated is completed, switching means operated by said subsequently operated mechanism to alternately disable said selecting mechanisms, and means operating independently of the selecting mechanism and upon the disabling thereof to limit the movement of the switches controlling the subsequently operating mechanism and for returning the delayed action mechanism to its initial position.

65. In a device of the kind described, two alternately operating selecting mechanisms operating in response to received impulses, two delayed action mechanisms one associated with each of the selecting mechanisms and operating under the influence thereof, two switches, a mechanism operated under the control of one of said switches and associated with one of said selecting mechanisms and adapted to operate subsequently to the completion of the selecting operation thereof, a plurality of mechanisms operated under the control of the other of said switches and associated with the other selecting mechanism and adapted to operate after the completion of the selecting operation thereof, and means for alternately disabling said selecting mechanisms upon the completion of the operation of the first of said subsequently operating mechanisms controlled by each of said switches, the remaining subsequently operating mechanisms being operable independently of the selecting mechanism with which they are associated and after the disabling thereof.

66. In a device of the kind described, two selecting mechanisms adapted to be alternately operated in response to received impulses, a delayed action mechanism associated with one of said selecting mechanisms and operating under the influence thereof, a plurality of mechanisms associated with said selecting mechanism, a switch having contacts adapted to sequentially energize said subsequently operating mechanisms and controlled by said delayed action mechanism to energize said subsequently operating mechanisms after the completion of the selecting operation of the selecting mechanism with which they are associated, and switching means adapted to alternately disable the selecting mechanisms under the control of the first of said sequentially operating mechanisms.

67. In a device of the kind described, two selecting mechanisms adapted to be alternately operated in response to received impulses, a plurality of mechanisms associated with said selecting mechanisms adapted to be operated subsequently to the completion of the selecting operation, a rotating switch having contacts adapted to sequentially control the operation of said subsequently operating mechanisms, a delayed action mechanism associated with one of said selecting mechanisms and adapted to control the extent of angular movement of said rotating switch and the time of its operation with respect to the time of operation of the selecting mechanism with which it is associated and a switching mechanism adapted to alternately disable the selecting mechanisms operated under the control of said rotating switch.

68. In a device of the kind described, a selecting mechanism operated in response to received impulses, a mechanism associated with said selecting mechanism and adapted to be operated subsequently to the completion of the operation thereof, a switch controlling said subsequently operating mechanism, a delayed action mechanism operating under the influence of said selecting mechanism and adapted to control the time of operation of said switch with respect to the time of operation of the selecting mechanism and the extent of movement of said switch, and a second switch adapted to disable said selecting mechanism and operated under the control of said first switch.

69. In a device of the kind described, a selecting mechanism, a plurality of mechanisms associated therewith, a switch having contacts adapted to sequentially energize said mechanisms, a delayed action mechanism associated with said selecting mechanism and operating under the influence thereof, and adapted to control the time of operation of said switch with respect to the time of operation of the selecting mechanism, and a second switch adapted to disable the selecting mechanism, operated under the control of said first switch and upon the completion of the operation of one of said sequentially operated mechanisms.

70. In a device of the kind described, a type-selecting mechanism operating in response to received impulses, a printing mechanism, a rotating switch controlling said printing mechanism, a delayed action mechanism associated with the selecting mechanism and operating to prevent the operation of said switch until the completion of the selecting operation and to limit the movement thereof, and a second switch adapted to disable the selecting mechanism and operated by the printing mechanism.

71. In a device of the kind described, a selecting mechanism operated in response to received impulses, a printing mechanism and a spacing mechanism associated therewith, a rotating switch having contacts adapted to control said printing and spacing mechanisms sequentially, a second switch controlled by the printing mechanism to disable the selecting mechanism, a delayed action mechanism operating under the influence of the selecting mechanism to control the time of operation and extent of rotation of the rotating switch, and means for returning the delayed action mechanism to its initial position subsequently to the disabling of the selecting mechanism.

72. In a device of the kind described, two selecting mechanisms adapted to be alternately operated in response to received impulses, two printing mechanisms each associated with one of said selecting mechanisms, a spacing mechanism associated with one of said selecting mechanisms, two rotating switches one associated with each of the selecting mechanisms, one adapted to control the printing mechanism associated therewith and the other adapted to control the printing and spacing mechanisms associated therewith, a switch adapted to alternately disable the selecting mechanisms and operated by the printing mechanisms, means for operating the spacing mechanism subsequently to the disabling of the selecting mechanism with which it is associated and independently thereof and two delayed action mechanisms each operating under the influence of the selecting mechanism with which it is associated and adapted to control the time and extent of operation of the switches controlling the printing mechanisms.

73. In a device of the kind described, two selecting mechanisms, a printing mechanism associated with each selecting mechanism, a spacing mechanism associated with one of the selecting mechanisms, a ribbon-actuating mechanism associated with the other selecting mechanism, and two delayed action mechanisms, one associated with each of the selecting mechanisms and operating under the control thereof to prevent the operation of the printing, spacing and ribbon mechanisms until after the selecting operation of the selecting mechanism with which they are associated.

74. In a device of the kind described, two selecting mechanisms, a printing mechanism associated with each selecting mechanism, a spacing mechanism associated with one of the selecting mechanisms, a ribbon-actuating mechanism associated with the other selecting mechanism, two delayed action mechanisms, one associated with each of the selecting mechanisms and operating under the control thereof to prevent the operation of the printing, spacing and ribbon mechanisms until after the completion of the selecting operation of the selecting mechanisms with which they are associated and means actuated by the printing mechanism for alternately disabling the selecting mechanisms.

75. In a device of the kind described, a rotating type wheel, an associated mechanism, means for electro-magnetically operating said associated mechanism, a pivoted contact, a contact mounted upon the type wheel and comprising an insulating portion forming a surface of mechanical contact with the pivoting contact and a conductive portion arranged below the face of the insulating portion, the relation of the speed of rotation of the type wheel and of the inertia of the pivoted contact being such as to prevent contact between the pivoted contact and the conductive portion of the contact mounted on the type wheel, except when the type wheel is brought to rest at a predetermined position.

76. In a device of the kind described, a rotating selecting element, a stop carried thereby, a slotted finger, a pivot passing through said slot about which the finger is adapted to oscillate into and out of the path of the stop and a spring supporting the finger, whereby the finger may be moved against the tension of the spring to an extent determined by the slot upon contact with the stop.

77. In a device of the kind described, a rotating selecting element having a plurality of circumferentially arranged guide rails, stops interposed between the guide rails, stops upon the guide rails and means responsive to dot and dash signals cooperating with said rotating selecting element, the means responsive to the dot signals being adapted to select as between the guide rails and the means responsive to the dash signals being adapted to select as between the stops on the rails.

78. In a device of the kind described, a rotating type wheel, concentrically arranged guide rails having stops thereon mounted upon said type wheel, a plurality of stops arranged between said guide rails, a finger responsive to dot impulses adapted to cooperate with said stops between guide rails and to select as between guide rails and a finger responsive to dash impulses adapted to select as between stops on the guide rails.

79. In a device of the kind described, means for moving the paper carriage, comprising a rotating shaft, means loosely mounted thereon for moving the paper carriage and electromagnetically operated means also mounted upon the shaft for causing loosely mounted means to rotate with the shaft.

80. In a device of the kind described, means for moving the paper carriage, comprising a rotating shaft, a reel loosely mounted thereon, a solenoid also mounted upon said shaft and means acting upon the energization of said solenoid to cause said reel to rotate with said shaft.

81. In a device of the kind described, a type wheel, means tending to rotate said type wheel, means for arresting the type wheel in angular positions determined by received impulses, comprising two fingers either of which may arrest the type wheel, operating in response to received impulses, one of said fingers being biased towards its arresting position and the other of said fingers being adapted to determine the circle within which the arresting finger operates to arrest the type wheel, a source of energy, means for disconnecting said source of energy adapted to be energized at a predetermined position of the type wheel, a delayed action mechanism adapted to release the type wheel from its cooperating finger at a predetermined time after the arrest of the type wheel to permit the type wheel to be rotated to its initial position, means for continuing the energization of the switch-opening means independently of the type wheel and after its release by the delayed action mechanism and means for returning the delayed action mechanism to its initial position to permit the biased finger to return under the influence of the biasing means into cooperative relation with the type wheel to arrest it in its initial position.

82. In a device of the kind described, a type wheel, means tending constantly to rotate the type wheel, means for bringing the type wheel to rest at a predetermined position, comprising two alternately operating fingers actuated in response to received impulses cooperating with the type wheel, either adapted to arrest the type wheel in angular positions determined by the received impulses and one adapted to determine the circle in which the arresting finger will operate to arrest the type wheel, a mechanism adapted to operate subsequently to the arrest of the type wheel, a delayed action mechanism operated under the influence of received impulses and adapted to determine the time interval between the arrest of the type wheel and the operation of the subsequently acting mechanism and to thereafter release the finger holding the type wheel in the arrested position to permit the type wheel to rotate to its initial position and means for returning the delayed action mechanism to its initial position to permit one of the fingers to arrest the type wheel in its initial position.

83. A printing telegraph machine including one of the relays forming part of the device described, an oscillating contact, a second cooperating contact the latter being rotatable about an axis substantially coincident with the line of oscillation of the oscillating contact whereby the two contacts with their operative surfaces are turned relatively to each other and substantially about the same axis.

84. In a device of the kind described, a rotatable switch, means constantly tending to rotate said switch, selecting means and means controlled by the selecting means for holding the switch against rotation and including a delayed action mechanism to permit rotation thereof after the completion of the selecting part of the printing mechanism.

85. In a device of the kind described, a rotatable switch tentative to continuously rotate, selecting means, means controlled by said selecting means for holding the switch against rotation, a delayed action mechanism to permit rotation thereof after the completion of the selecting part of the printing mechanism and means to operate said printing mechanism while the selecting means are at rest.

86. In a device of the character described, a rotatable switch, means constantly tending to rotate said switch, selecting means, means controlled by said selecting means for holding said switch against rotation, a delayed action mechanism to permit rotation thereof after the completion of the selecting part of the printing mechanism, means for checking the rotation of said switch upon the completion of a predetermined angular movement thereof and means operating said printing mechanism independently of the selecting mechanism while the latter is at rest.

87. In a device of the kind described, a rotary switch tentative to continuously rotate, comprising a cylindrical body provided on each end with a flange-like contact cam, a stop-pin positioned on the inner faces of said cams, said pins located circumferentially in close proximity about 90 degrees apart, contact brushes to cooperate with said cams, selecting means, means controlled by said selecting means, means for holding said switch against rotation, including a delayed action mechanism, to permit rotation thereof after the completion of the selecting part of the printing mechanism and means to operate said printing mechanism while the selecting means are at rest.

In testimony whereof I affix my signature.

OSCAR L. KLEBER.